US007694597B2

(12) United States Patent
Nishi et al.

(10) Patent No.: US 7,694,597 B2
(45) Date of Patent: Apr. 13, 2010

(54) VEHICLE POWER UNIT WITH IMPROVED LUBRICATION OIL RECOVERY STRUCTURE

(75) Inventors: Toru Nishi, Saitama (JP); Toshinari Mohara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 337 days.

(21) Appl. No.: 11/805,342

(22) Filed: May 23, 2007

(65) Prior Publication Data

US 2007/0295159 A1 Dec. 27, 2007

(30) Foreign Application Priority Data

May 26, 2006 (JP) ............................ 2006-146731

(51) Int. Cl.
*B60K 17/08* (2006.01)
*F16H 57/02* (2006.01)
*F16H 57/04* (2006.01)

(52) U.S. Cl. ....................... 74/325; 74/606 A; 184/11.2

(58) Field of Classification Search ............... 74/606 A, 74/605; 184/11.2

See application file for complete search history.

(56) References Cited

U.S. PATENT DOCUMENTS 4,914,968 A * 4/1990 Diermeier et al. ............. 74/467
5,025,673 A * 6/1991 Yamada ..................... 74/337.5
6,296,073 B1 * 10/2001 Rioux et al. ................ 180/292
6,941,918 B2 * 9/2005 Laimboeck ............. 123/195 R
2006/0123944 A1 * 6/2006 Suzuki et al. ............. 74/606 R

FOREIGN PATENT DOCUMENTS

JP 58-195012 U 12/1983
JP 10-119591 5/1998
JP 2002-227939 8/2002
JP 2003-239715 8/2003
JP 2003-306191 A 10/2003
JP 2004-036633 A 2/2004

* cited by examiner

*Primary Examiner*—Sherry L Estremsky
*Assistant Examiner*—Edwin A. Young
(74) *Attorney, Agent, or Firm*—Carrier, Blackman & Associates P.C.; William D. Blackman; Joseph P. Carrier

(57) ABSTRACT

A power unit of a vehicle, which includes an internal combustion engine and a transmission, is provided which is configured to quickly return lubricating oil fed to the transmission to an oil storage portion of the power unit case. The transmission includes a gear train housed in a gear chamber, the gear train executing power transmission among an input shaft, an intermediate shaft and an output shaft. The input shaft and the output shaft are arranged such that a line connecting their respective shaft centers extends almost horizontally above a communicating port which permits return oil flow between segregated portions of the power unit case. In addition, the intermediate shaft is disposed above and between the input shaft and the output shaft.

12 Claims, 12 Drawing Sheets

FIG. 12B
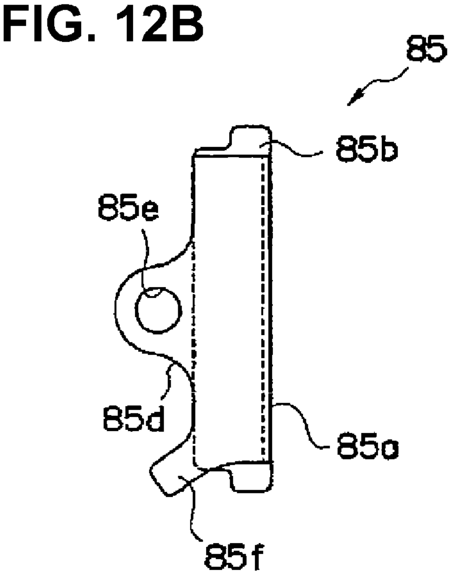
FIG. 12A
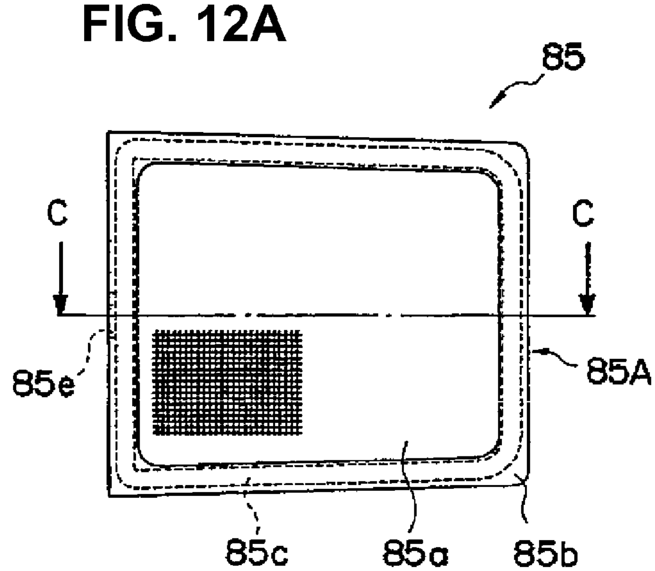
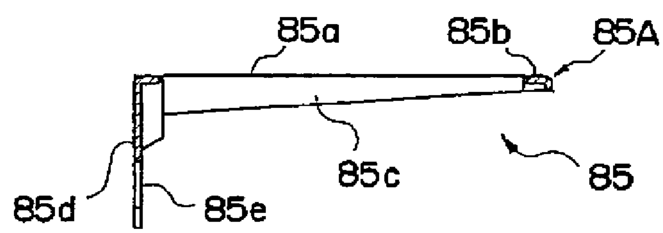
FIG. 12C

VEHICLE POWER UNIT WITH IMPROVED LUBRICATION OIL RECOVERY STRUCTURE

CROSS-REFERENCE TO RELATED APPLICATIONS

The present invention claims priority under 35 USC 119 based on Japanese patent application No. 2006-146731, filed on May 26, 2006. The subject matter of this priority document is incorporated by reference herein.

BACKGROUND OF THE INVENTION

1. Field of the Invention

The present invention relates to a vehicle power unit, the power unit including an internal combustion engine and a transmission, the transmission modifying the rotational speed of the engine and transmitting the rotational driving force of the engine to vehicle wheels.

2. Description of the Background Art

In a known a vehicle power unit, which includes an internal combustion engine and a transmission, the transmission is configured to include input and output shafts disposed parallel to each other, and to further include a plurality of gear trains arranged between the input and output shafts. Such a power unit is disclosed, for example, in Japanese Patent Laid-Open No. 2002-227939. In the known vehicle power unit, lubricating oil is fed to sliding portions such as shafts and gears in order to stably operate an internal combustion engine and a power transmission device. A power unit case, which provides a housing for the internal combustion engine and the power transmission device, is formed with an oil storage portion adapted to collect the lubricating oil, which is fed under pressure to various portions by a feed pump.

The power transmission device of Japanese Patent Laid-Open No. 2002-227939 transmits rotation of a crankshaft to a main shaft, and the rotation of the main shaft to a countershaft in order to set a forward stage, or to an idle shaft for setting a reverse stage. Thus, the rotation of either the counter shaft or idle shaft is transmitted to an output shaft. These shafts are rotated and are provided with gears thereon; therefore, lubricating oil is fed to the shafts and to the gears. The lubricating oil fed to the shafts collects on the bottom of an inner space housed in a gear case housing the power transmission device.

However, the output shaft in the power transmission device of Japanese Patent Laid-Open No. 2002-227939 is disposed below a line connecting the respective shaft centers of the counter shaft and the idle shaft. Therefore, gearwheels carried on a shaft whose height from the oil storage portion is small are met with great stirring resistance, which may possibly lead to deterioration in power transmission efficiency.

In view of such a problem, an object of the present invention is to provide a power transmission device for a vehicle configured to quickly return lubricating oil which has been fed to the power transmission device to an oil storage portion.

SUMMARY

To achieve the above object, a power unit for a vehicle according to the present invention includes a power unit case adapted to house an internal combustion engine, and at least part of a transmission for transmitting rotation of a crankshaft to vehicle wheels. The power unit case is formed with an oil storage portion adapted to collect lubricating oil in an inner lower side thereof. In addition, a gear chamber is supported by the crankcase. The lubricating oil fed to the gear chamber is discharged through a communicating port to the inside of the crankcase, and is returned to the oil storage portion. The communicating port is formed in one side face of the crankcase and permits the gear chamber to communicate with a crank chamber. The transmission includes an input shaft, an intermediate shaft and an output shaft which are housed in the gear chamber, and further includes gear trains executing power transmission among the input shaft, the intermediate shaft and the output shaft. The input shaft and the output shaft are arranged so that a line connecting respective shaft centers extends almost horizontally when the power unit is installed in a vehicle. The intermediate shaft is disposed above and between the input shaft and the output shaft, and the communicating port is disposed below the intermediate shaft.

In the illustrative embodiment, the communicating port is positioned adjacent to a wall surface extending downward toward the oil storage portion. The communicating port is disposed adjacent to a bottom surface of the gear chamber, and is formed inside a gear case attached to cover a portion of one side face of the crankcase. The input shaft receives rotation of crankshaft that has been changed in speed and the output shaft is a driving shaft of a transmission mechanism transmitting rotation to the wheels. Among gears constituting the gear trains, at least a drive gear provided on the input shaft and an idle gear provided on the intermediate shaft to mesh with the drive gear are housed in the gear chamber.

In the power unit of a vehicle configured described above, the input shaft and the output shaft constituting part of the transmission are disposed at almost the same height in the gear chamber, and the intermediate shaft is disposed above the input and output shafts. The communicating port provided on the bottom portion of the gear chamber is set at a high position. Thus, an increased difference in height between the communicating port and the oil storage portion is ensured. The lubricating oil in the gear chamber is quickly discharged to the oil storage portion and the possibility that the lubricating oil is returned from the oil storage portion to the gear case through the communicating port is reduced. In addition, since the communicating port is located below the intermediate shaft disposed between the input and output shafts, it is easy to discharge the lubricating oil through the communicating port even if the oil level becomes inclined, as occurs when the vehicle is operated on a hill.

Since the communicating port is located close to the wall surface extending downward toward the oil storage portion, the lubricating oil discharged from the gear chamber through the communicating port is returned to the storage portion while running along the wall surface. Thus, even if the increased difference in height between the communicating port and the oil storage chamber is ensured, the lubricating oil discharged through the lubricating port will not directly drop in the oil storage portion, whereby generation of foam the lubricating oil stored in the oil storage portion is avoided. As a result, the possibility that an oil pump produces air lock is reduced.

Since the communicating port is disposed adjacent to the bottom surface of the gear chamber, the level of the lubricating oil stored inside the gear chamber is lowered. The amount of the lubricating oil discharged to the oil storage portion is increased and the stirring resistance of the gear train housed in the gear chamber is reduced.

Among gears which constitute the gear trains, the drive gear and the idle gear meshing with the drive gear are housed in the gear chamber. When the gear case is removed, both the drive gear and the idle gear are exposed to the outside of one side face of the crankcase, and therefore can be each removed and replaced with another. Thus, the ability to provide maintenance for the gear train is enhanced and the reduction ratio of the power transmission device is easily changed only by changing the gear ratio between the drive gear and idle gear when the gears are each removed and replaced with another. Similarly, when the gear case is removed, the communicating port formed in one side face of the crankcase is exposed. Thus, the maintenance for the peripherals of the communicating port is also easily performed.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

BRIEF DESCRIPTION OF THE DRAWINGS

FIG. 12(*a*) is a bottom view of the strainer used in the power unit of FIG. 1.

FIG. 12(*b*) is a side view of the strainer of FIG. 12(*a*).

FIG. 12(*c*) is a sectional view of the strainer taken along line C-C of FIG. 12(*a*).

DETAILED DESCRIPTION

Selected illustrative embodiments of the invention will now be described in some detail, with reference to the drawings. It should be understood that only structures considered necessary for clarifying the present invention are described herein. Other conventional structures, and those of ancillary and auxiliary components of the system, are assumed to be known and understood by those skilled in the art. In the figures, arrows U and F denote the upper side and front, respectively, and references to left and right directions are made with respect to the front.

Figure 1:
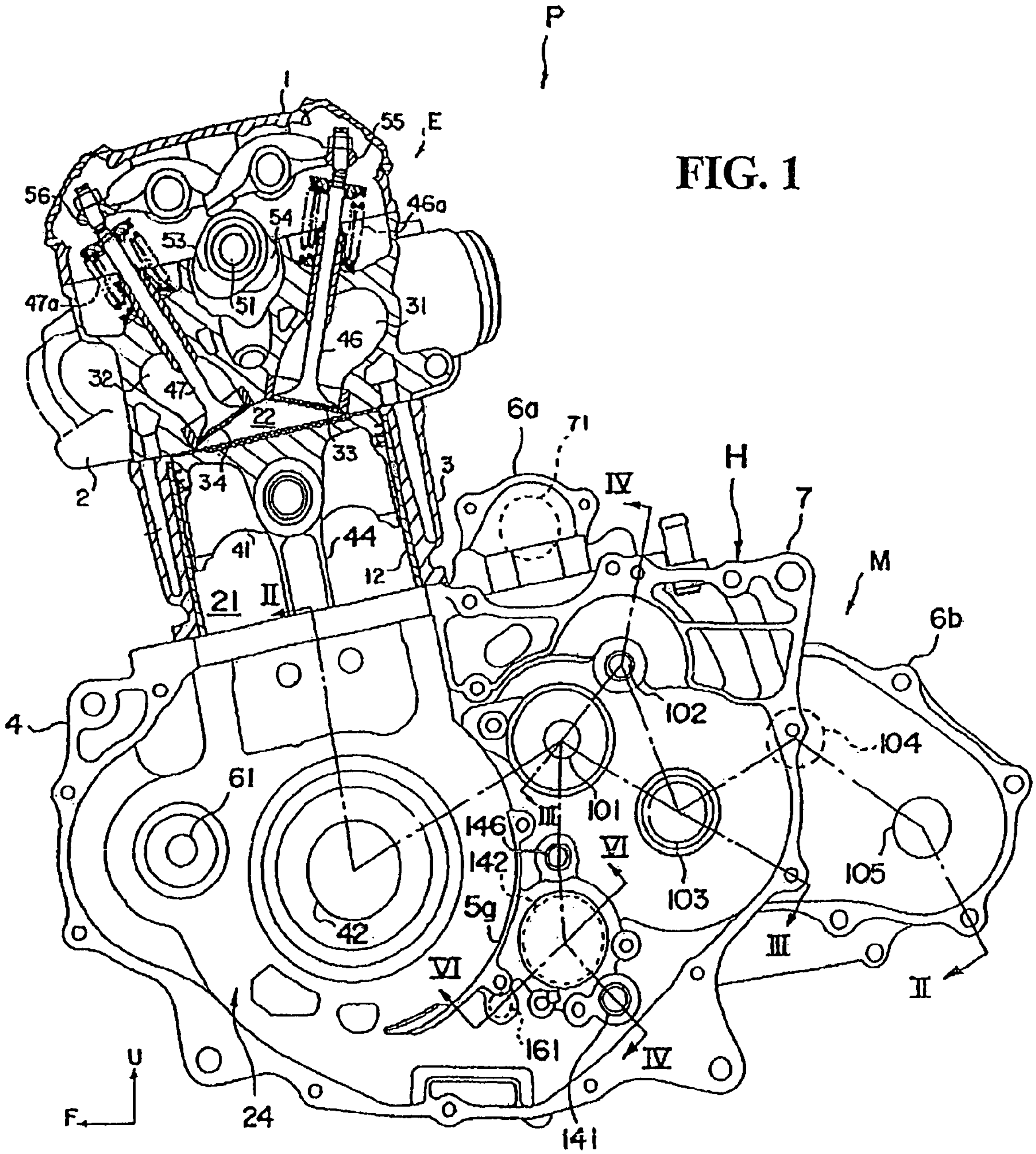
FIG. 1 is a left side sectional view of a power unit provided with the lubricating system for a vehicle according to the present invention, showing an internal combustion engine at a front side of the power unit, and a transmission disposed within the power unit housing at a rear side of the engine.

FIG. 1 is a cross-sectional view of a power unit P of a saddle-ride type vehicle as viewed from the left side, the power unit being provided with a lubricating device according to the present invention. Saddle-type vehicles are characterized by a seat which is straddled by the vehicle operator. Examples of saddle-ride type vehicles include, but are not limited to, four-wheeled all-terrain vehicles, motorcycles, and jet-skis.

The power unit P is composed of a single-cylinder, four-stroke engine E and a power transmission M which transmits rotational driving force of the engine E to rear wheels (not shown).

Figure 2:
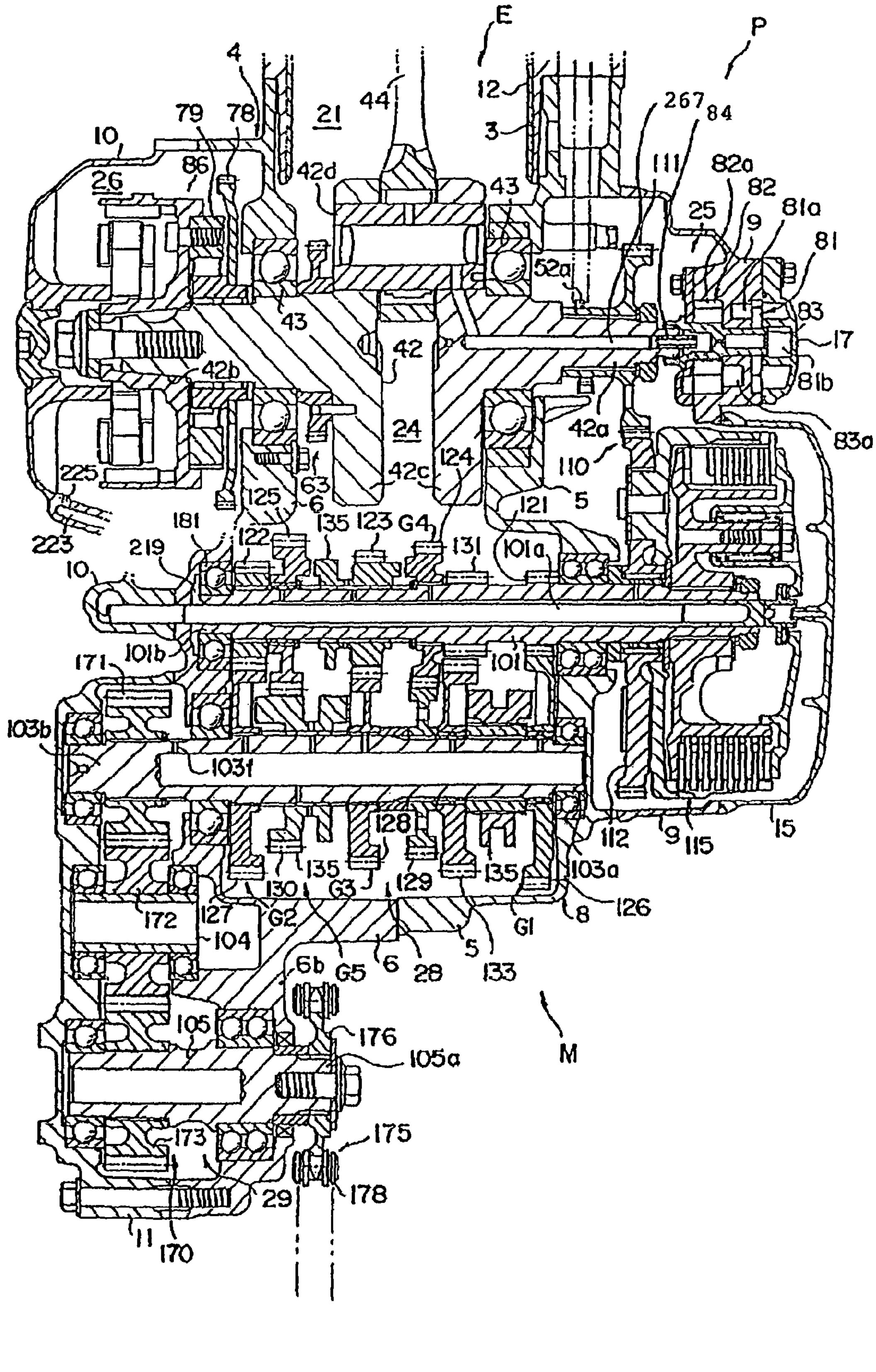
FIG. 2 is a sectional view of the power unit of FIG. 1 taken along line II-II of FIG. 1 and viewed in the direction of the line arrows.

Referring to FIGS. 1 and 2, the engine E is configured to include a crankcase 4, a cylinder block 3, a cylinder head 2 and a head cover 1. The crankcase 4 rotatably supports a crankshaft 42 at the left and right sides thereof and houses the crankshaft 42 in an internal space (the crank chamber 24). The cylinder block 3 is connected to an upper side of the crankcase 4, and internally forms a cylindrical bore 21. A piston 41 axially reciprocates within the bore 21. The cylinder head 2 is connected to the cylinder block 3 so as to cover the cylinder bore 21 from above. In addition, the head cover 1 is attached to the cylinder head 2 so as to cover the cylinder head 2 from above. The cylinder bore 21 is surrounded by the internal circumferential surface of a sleeve 12 fitted inside the cylinder block 3. The crank chamber 24 houses the left and right crank webs 42*c*, 42*c* of the crankshaft 42 and a crank pin 42*d*. The cylinder bore 21 communicates with the crank chamber 24. The piston 41 is connected to the crankshaft 42 through a connecting rod 44.

A combustion chamber 22 is defined by the cylinder head 2, the sleeve 12 and the piston 41. The combustion chamber 22 communicates with an intake port 31 and an exhaust port 32 formed inside the cylinder head 2, through an intake opening 33 and an exhaust opening 34, respectively. An intake valve 46 and an exhaust valve 47 attached to the cylinder head 2 are biased in directions of closing the intake and exhaust openings 33 and 34 by valve springs 46*a* and 47*a*, respectively. A cam shaft 51 is provided on its outer circumferential face with cams 53, 54, and is rotatably supported between confronting surfaces of the head cover 1 and the cylinder head 2. Rocker arms 55, 56 are pivotably provided inside the head cover 1 in such a manner that one ends of the rocker arms 55 and 56 are abutted against the cams 53 and 54, respectively, of the cam shaft 51 and the other ends of the rocker arms 55 and 56 are abutted against the upper ends of the intake and exhaust valves 46 and 47, respectively. Rotation of the crankshaft 42 is transmitted to the cam shaft 51 through chain transmission. When the cam shaft 51 is rotated, the rocker arms 55 and 56 are pivoted at predetermined times through the action of the cams 53 and 54, respectively. Thus, the intake and exhaust valves 46 and 47 are moved downward against the biasing force of the valve springs 46*a* and 47*a* to thereby open the intake and exhaust openings 33 and 34, respectively.

An intake pipe, not shown, communicating with the outside is connected to the intake port 31. A throttle valve for adjusting an intake volume, an injector for injecting fuel and an air cleaner for purifying outside air are attached to the intake pipe. When the piston 41 moves downward, the air purified by the air cleaner is mixed with fuel injected by the injector. The air-fuel mixture of the amount according to the opening angle of the throttle valve is fed to the combustion chamber 22 from the intake port 31 via the intake opening 33. The air-fuel mixture is compressed as the piston 41 moves upward and then ignited for combustion by an ignition plug, not shown, attached to the cylinder head 2, which again moves the piston 41 downward. When the piston 41 again moves upward, the exhaust gas is discharged to the outside through the exhaust opening 34, the exhaust port 32 and an exhaust pipe, not shown, connected to the exhaust port 32. While the series of strokes of intake, compression, combustion and exhaust are repeated, the piston 41 is reciprocated to rotate the crankshaft 42.

The crankcase 4 is split into a right-half section and a left-half section, namely, a right case 5 and a left case 6, which are connected to each other. A right cover 9 is attached to cover part of the right side surface of the right case 5. A left cover 10 is attached to cover the front portion of the left side surface of the left case 6.

A right end portion 42*a* of the crankshaft 42 is received in the inside (a right auxiliary machinery chamber 25) of the right cover 9. A cam drive sprocket 52*a* and a primary drive gear 111 of the transmission M constitute a chain transmission mechanism for transmitting power to the cam shaft 51, and are connected to the right end portion 42*a* of the crankshaft 42. A drive shaft 83 of an oil pump (a feed pump 81 and a scavenging pump 82) is coupled to the right end of the crankshaft 42. A left end portion 42*b* of the crankshaft 42 is received in the inside (a left auxiliary machinery chamber 26) of the left cover 10. A generator 86 is provided on the left end portion 42*b*. In addition, a starter driven gear 78 adapted to start the crankshaft 42 via a one way clutch 79 is connected to the left end portion 42*b*. The rotational drive force of a starter motor 71 is transmitted to the starter driven gear 78. The starter motor 71 is attached to a motor attachment bracket 6*a* integrally extending upward from the left case 6.

As shown in FIG. 1, a balancer shaft 61 is rotatably received in the crank chamber 24. The balancer shaft 61 is located forward of the crankshaft 42 and functions as a primary balancer shaft. A balancer drive gear 63*a* is provided on the crankshaft 42 so as to be in contact with the left crank web 42*c*. The balancer drive gear 63*a* constitutes a gear train 63 adapted to rotate the balancer shaft 61 simultaneously with the crankshaft 42.

As shown in FIGS. 1 to 4, the transmission M is provided in the inside (the transmission chamber 28) of and on the outside of the transmission case 8 formed integrally with the rear portion of the crankcase 4. The transmission M includes a main shaft 101, a reverse idle shaft 102, a counter shaft 103, a final idle shaft 104 and an output shaft 105, which are provided parallel to the crankshaft 42; a primary gear train 110; a speed change mechanism 120; a final gear train 170; and a chain drive mechanism 175. The primary gear train 110 is provided between the crankshaft 42 and the main shaft 101. The speed change mechanism 120 includes a plurality of speed change gear trains G1 to G5 and GR located between the main shaft 101 and the counter shaft 103. The final gear train 170 is located between the counter shaft 103 and the output shaft 105. In the case of a four-wheeled all-terrain vehicle, the chain drive mechanism 175 is located between the output shaft 105 and the rear wheels.

As shown in FIG. 1, the five shafts 101 to 105 are arranged from the front in order of the reference numerals and located on the upside of the crankshaft 42. Specifically, the main shaft 101 is located rearward and upward of the crankshaft 42. The counter shaft 103 is located rearward and downward of the main shaft 101. The reverse idle shaft 102 is located above and between the main shaft 101 and the counter shaft 103 in the front-to-rear direction. The counter shaft 103 and the output shaft 105 are juxtaposed in the front-to-rear direction so that a line connecting their shaft centers extends almost horizontally. The final idle shaft 104 is disposed above and between the shafts 103 and 105 in the front-to-rear direction.

Figure 3:
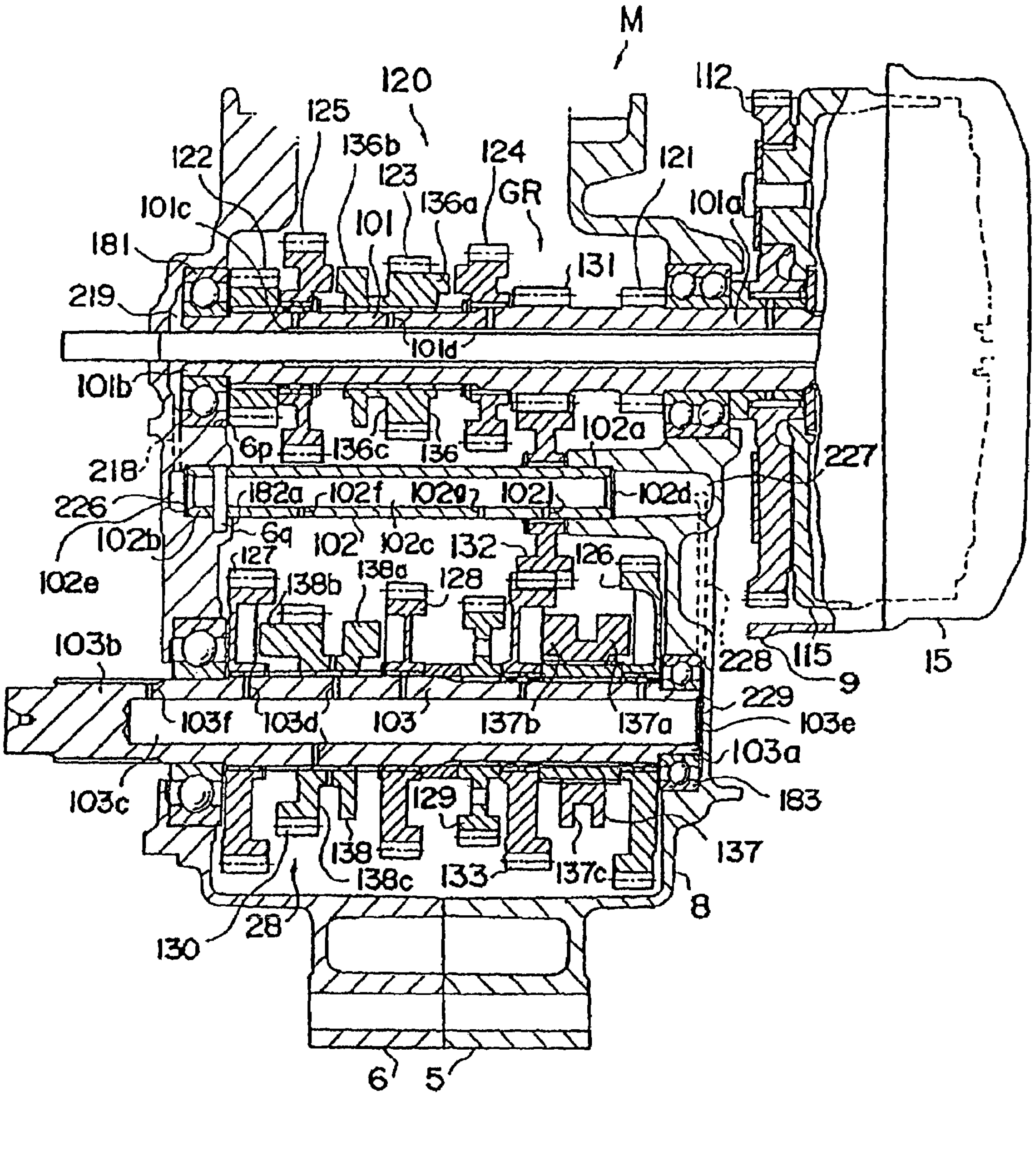
FIG. 3 is a sectional view of the power unit of FIG. 1 taken along line III-III of FIG. 1 and viewed in the direction of the line arrows.

As shown in FIG. 3, the main shaft 101, the reverse idle shaft 102 and the counter shaft 103 are supported at both ends thereof by the transmission case 8 (that is, the right case 5 and the left case 6) so as to be housed in the transmission chamber 28. Incidentally, the main shaft 101 and the counter shaft 103 are rotatably supported whereas the reverse idle shaft 102 is fixed relative to the transmission case 8.

As shown in FIG. 2, the right end portion 101*a* of the main shaft 101 is received in the right auxiliary machinery chamber 25. The primary gear train 110 includes the primary drive gear 111, and a primary driven gear 112 provided at the right end portion 101*a* of the main shaft 101 so as to be rotatable with respect thereto and meshing with the primary drive gear 111. A clutch mechanism 115 is provided at the right end of the main shaft 101. The clutch mechanism 115 is operative to cause the primary driven gear 112 to be engaged with and disengaged from the main shaft 101. The right cover 9 has an opening portion which otherwise covers the clutch mechanism 115. A clutch cover 15 is attached to cover the opening portion (see FIG. 11).

The speed change gear train includes first to fifth speed gear trains G1 to G5 for setting a forward stage as shown in FIG. 2 and a reverse gear train GR for setting a reverse stage as shown in FIG. 3. The first to fifth gear trains G1 to G5 are provided between the main shaft 101 and the counter shaft 103. The reverse gear train GR is provided between the main shaft 101 and the counter shaft 103 via the reverse idle shaft 102. The gear trains G1 to G5 and GR have gear ratios set to differ from each other and one set of gears constituting each gear train is provided to be rotatable with respect to the corresponding shaft.

Figure 4:
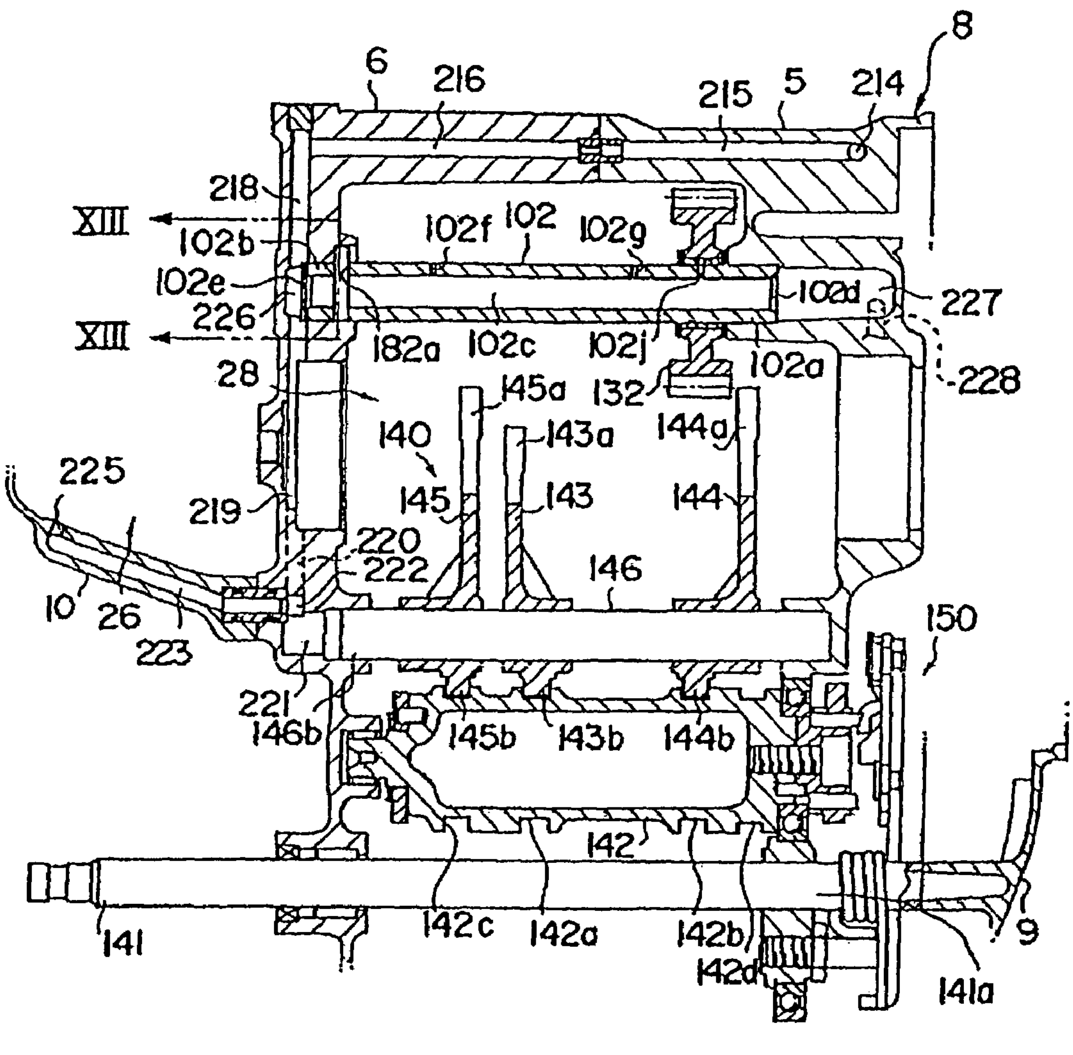
FIG. 4 is a sectional view of the power unit of FIG. 1 taken along line IV-IV of FIG. 1 and viewed in the direction of the line arrows.

The speed change mechanism 120 shown in FIGS. 2 to 4 is a constantly gear-meshing type speed change mechanism which can select one of five forward speeds and one reverse speed, and which includes the six speed change gear trains G1 to G5 and GR, a dog clutch mechanism 135 and a shift change mechanism 140. The speed change mechanism 120 is housed in the transmission chamber 28. The speed change mechanism 120 is configured as below. The shift change mechanism 140 is operated by an operator to responsively operate the dog clutch mechanism 135, whereby one of the speed change gear trains G1 to G5 and GR is rotated integrally with the main shaft 101 and the counter shaft 103. In this way, the rotation of the main shaft 101 is changed in speed in response to the gear ratio of the gear train rotatable integrally with the shafts 101, 103 and the changed rotation is transmitted to the counter shaft 103.

Referring to FIGS. 1 and 2, a gear bracket 6*b* is formed integrally with the rear portion of the left case 6 so as to project rearward. A gear case 11 is attached to cover the rear portion of the left side surface of the left case 6 and the left side surface of the gear bracket 6*b*. The left end portion 103*b* of the counter shaft 103 projects from the left case 6 and is received in the final gear chamber 29 formed inside the gear case 11. The final idle shaft 104 and the output shaft 105 have respective right ends supported by the gear bracket 6*b* and respective left ends supported by the gear case 11 and are received in the final gear chamber 29.

The final gear train 170 includes a final drive gear 171, a final idle gear 172 and a final driven gear 173. The final drive gear 171 is provided at the left end portion 103*b* of the counter shaft 103. The final idle gear 172 is provided on the final idle shaft 104 so as to mesh with the final drive gear 171. The final driven gear 173 is provided on the output shaft 105 so as to mesh with the final idle gear 172. As shown in FIG. 2, the right end portion 105*a* of the output shaft 105 projects rightward of the gear bracket 6*b* to be exposed to the outside of the transmission case 8. The chain drive mechanism 175 includes a drive sprocket 176 joined to the right end portion 105*a* of the output shaft 105; a driven sprocket, not shown, connected to the rear wheel; and a drive chain 178 wound between both the sprockets. The chain drive mechanism 175 is disposed rearward of the transmission case 8.

With such a transmission M, rotation of the crankshaft 42 is transmitted to the main shaft 101 via the primary gear train 110 and the main clutch 115. The rotation of the main shaft 101 is transmitted to the counter shaft 103 via any one of the speed change gear trains. The rotation of the counter shaft 103 is transmitted to the output shaft 105 via the final gear train 170. The rotation of the output shaft 105 is finally transmitted to the rear wheel via the chain drive mechanism 175.

The speed change mechanism 120 is now described with reference to FIGS. 2 to 4. The first through fifth speed gear trains G1 through G5 are arranged in order, from the right, of the first speed gear train G1, the fourth speed gear train G4, the third speed gear train G3, the fifth speed gear train G5, and the second speed gear train G2. The gear trains G1 to G5 include drive gears 121 to 125 carried on the main shaft 101 and driven gears 126 to 130, carried on the counter shaft 103, each of which meshes with a corresponding one of the drive gears 121 to 125. Among the gear trains G1 to G5, the drive gears 121 to 123 are carried on the main shaft 101 so as to be constantly rotatable integrally therewith and the driven gears 129, 130 are carried on the counter shaft 103 so as to be constantly rotatable integrally therewith. In addition, the drive gears 124, 125 are carried on the main shaft 101 so as to be rotatable with respect to each other and the driven gears 126 to 128 are carried on the counter shaft 103 so as to be rotatable with respect to each other. As shown in FIG. 3, the reverse gear train GR is disposed between the first and the fourth speed gear train G1 and G4 in the leftward and rightward direction. The reverse gear train GR includes a reverse drive gear 131 integral with the main shaft 101; a reverse idle gear 132 carried on the reverse idle shaft 102 so as to mesh with the reverse drive gear 131 for relative rotation; and a reverse driven gear 133 carried on the counter shaft 103 so as to mesh with the reverse idle gear 132 for relative rotation.

The dog clutch mechanism 135 shown in FIGS. 2 and 3 includes a first shift sleeve 136, a second shift sleeve 137 and a third shift sleeve 138. The first shift sleeve 136 is formed integrally with the third speed drive gear 123 so as to be axially movable between the fourth and the fifth speed drive gears 124 and 125. The second shift sleeve 137 is rotatable integrally with the counter shaft 103 and axially movable between the first speed and the reverse driven gears 126 and 133. The third shift sleeve 138 is formed integrally with the fifth driven gear 130 so as to be axially movable between the second and the third speed driven gears 127 and 128. Incidentally, FIGS. 2 and 3 depict the state where the first to three shift sleeves 136 to 138 are in their respective neutral positions. The shift sleeves 136, 137 and 138 are formed with dog tooth 136*a*, 137*a* and 138*a*, respectively, projecting rightward and with dog tooth 136*b*, 137*b* and 138*b*, respectively, projecting leftward. The fourth and the fifth speed drive gears 124, 125 (rotatable with respect to each other) adjacent to the shift sleeve 136 are formed on their faces opposed thereto with respective engagement holes adapted to engage with the corresponding dog tooth 136*a*, 136*b*. The driven gears 126, 133 (rotatable with respect to each other) adjacent to the shift sleeve 137 are formed on their faces opposed thereto with respective engagement holes adapted to engage with the corresponding dog tooth 137*a*, 137*b*. The second and the third speed gears 127, 128 (rotatable with respect to each other) adjacent to the shift sleeve 138 are formed on their faces opposed thereto with respective engagement holes adapted to engage with the corresponding dog tooth 138*a*, 138*b*. The shift sleeves 136, 137 and 138 are formed at their left-right central portions with fork grooves 136*c*, 137*c* and 138*c* adapted to engage with the leading ends 143*a*, 144*a* and 145*a* of the shift forks 143, 144 and 145, respectively, included in the shift change mechanism 140.

The shift change mechanism 140 is shown in FIGS. 1 and 4, and includes a shift spindle 141 rotated in response to the operation of a shift pedal; a shift drum 142; first, second and third shift forks 143, 144 and 145: and a fork shaft 146 supporting the first, second and the third shift forks 143, 144, 145. The shift drum 142 is connected to the shift spindle 141 via an interlocking mechanism 150 and rotated by a predetermined angle at in time with the rotation of the shift spindle 141. The first, second and third shift forks 143, 144 and 145 are respectively engaged with three cam grooves 142*a*, 142*b* and 142*c* formed on the outer circumferential face of the shift drum 142.

The shift spindle 141, the shift drum 142 and the fork shaft 146 are each supported at both ends thereof by the transmission case 8 and received in the lower portion of the transmission chamber 28. The shift spindle 141 and the shift drum 142 are rotatably supported whereas the fork shaft 146 is fixed to the transmission case 8. Aright end 141*a* of the shift spindle 141 is received in the right auxiliary machinery chamber 25 and is connected to the interlocking mechanism 150. The shift fork 143 has a distal end 143*a* engaged with the fork groove 136*c* of the first shift sleeve 136 and a proximal end 143*b* engaged with the first cam groove 142*a*. The second shift fork 144 has a distal end 144*a* engaged with the fork groove 137*c* of the second shift sleeve 137 and a proximal end 144*b* engaged with the second cam groove 142*b*. The third shift fork 145 has a distal end 145*a* engaged with the fork groove 138*c* of the third shift fork 138 and a proximal end 145*b* engaged with the third cam groove 142*c*.

With the dog clutch mechanism 135 and the shift change mechanism 140 configured as described above, the shift spindle 141 is rotated in response to the operation of the shift pedal. Since the shift spindle 141 is interlocked with the rotation the shift drum 142, the shift drum 142 is rotated in a predetermined rotational direction by a predetermined angle in time with the shift spindle 141. Thus, the first, second and third shift fork 143, 144 and 145 are guided by the cam grooves 142*a*, 142*b* and 142*c*, respectively, to move in the axial direction of the fork shaft 146. Movement of each of the shift forks 143, 144 and 145 axially moves a corresponding one of the shift sleeves 136, 137 and 138 on a corresponding one of the main shaft 101 and the counter shaft 102. In this way, the speed change stage according to the shift pedal operation is set as described further below.

When all of the first, second and third sleeves 136, 137 and 138 are placed at their respective neutral positions, a neutral stage is established in which power transmission from the main shaft 101 to the counter shaft 103 is interrupted. When the shift pedal is operated from the neutral state to shift gears to the upshift side, the shift drum 142 is rotated in a direction of arrow R1 at a predetermined angle to move the second shift sleeve 137 rightward. This causes the first speed driven gear 126 to be integrally rotatable with the countershaft 103, thereby establishing a first speed stage in which power transmission is executed through the first speed gear train G1. With a repeat of the same operation, the third shift sleeve 138 is moved leftward to cause the second speed driven gear 127 to be integrally rotatable with the counter shaft 103, thereby establishing a second speed stage in which power transmission is executed through the second speed gear train G2. The third shift sleeve 138 is moved rightward to cause the third speed driven gear 128 to be integrally rotatable with the counter shaft 103, thereby establishing a third speed stage in which power transmission is executed through the third speed gear train G3. The first shift sleeve 136 is moved rightward to cause the fourth speed drive gear 124 to be integrally rotatable with the main shaft 101, thereby establishing a fourth speed stage in which power transmission is executed through the fourth speed gear train G4. The first shift sleeve 136 is moved leftward to cause the fifth speed drive gear 125 to be integrally rotatable with the main shaft 101, thereby establishing a fifth speed stage in which power transmission is executed through the fifth speed gear train G5.

Figure 6:
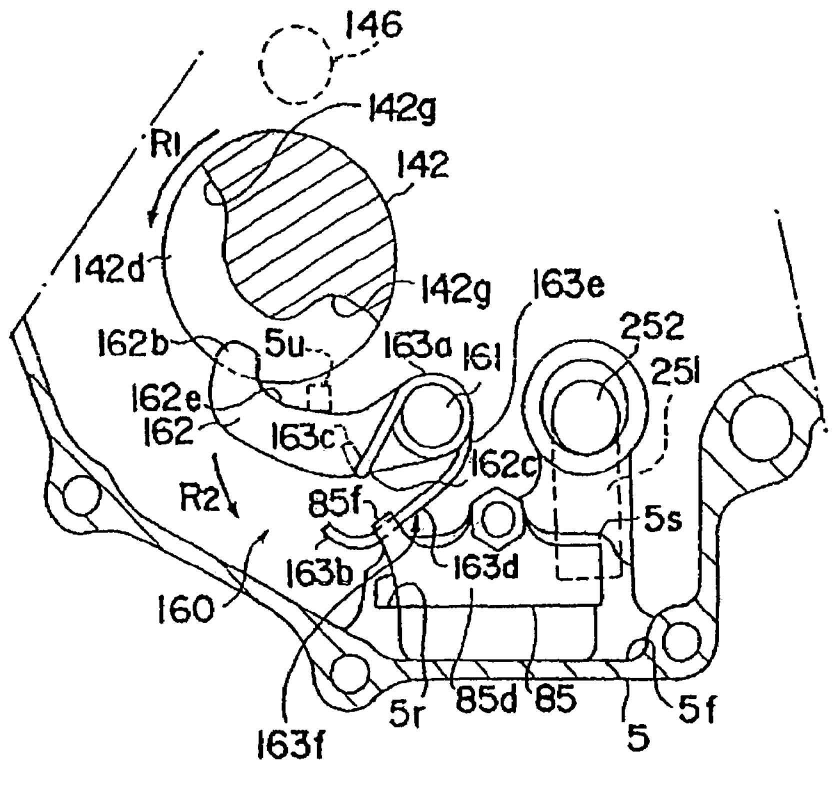
FIG. 6 is a side sectional view of a portion of the right case of the power unit of FIG. 1, showing a strainer and a reverse inhibitor mechanism.

When a reverse arm (not shown) attached to the handlebar of the vehicle is operated, an inhibitor mechanism 160 shown in FIG. 6 is released. In addition, the desired operation of the shift pedal is then performed with the neutral stage established to rotate the shift drum 142 in a direction opposite to the rotational direction toward the upshift side mentioned above. This moves the second shift sleeve 137 rightward to cause the reverse driven gear 133 to be integrally rotatable with the counter shaft 103, thereby establishing a reverse stage in which power transmission is executed through the reverse gear train GR.

In the establishment of the speed change stages discussed above, of the three shift sleeves, the two shift sleeves which are omitted from the explanation are returned to or maintain their respective neutral positions. For example, during establishment of engagement of the first speed gear train, the second shift sleeve 137 moves rightward to cause the first speed driven gear 126 to be integrally rotatable with the countershaft 103, while the first shift sleeve 136 and third shift sleeve 138 maintain their respective neutral positions.

Figure 5:
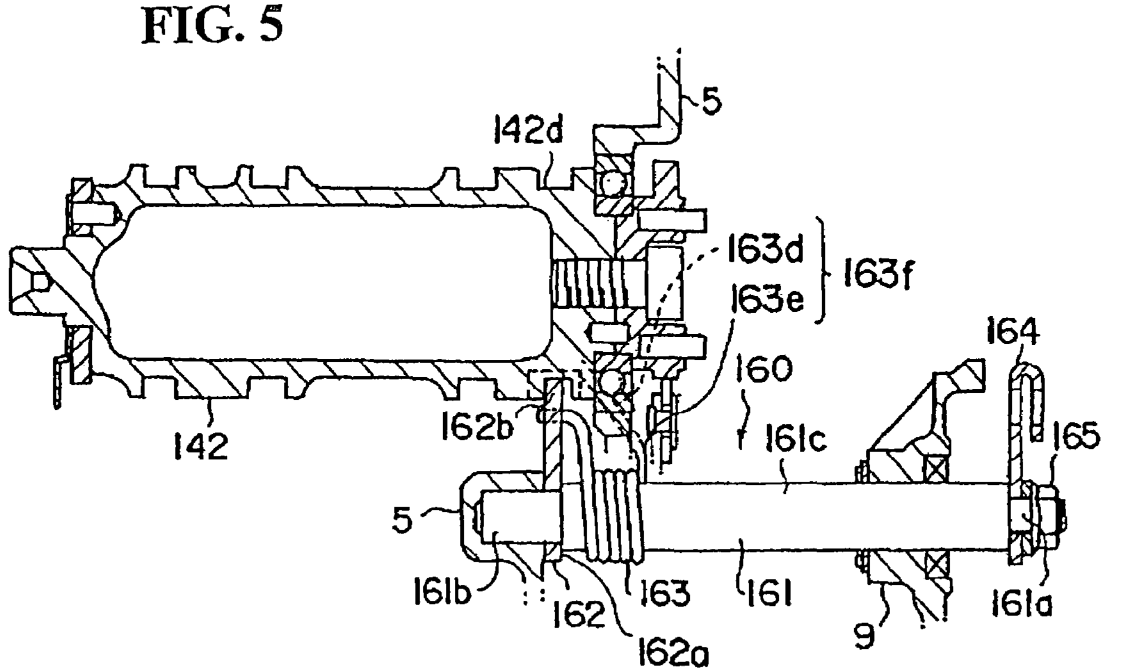
FIG. 5 is a sectional view of the power unit of FIG. 1 taken along line VI-VI of FIG. 1 and viewed in the direction of the line arrows.

As shown in FIGS. 5 and 6, the speed change mechanism 120 includes a reverse inhibitor mechanism 160 which restricts the rotational operation of the shift drum 142 of the shift change mechanism 140 in order to prevent the unintended establishment of the reverse stage. The reverse inhibitor mechanism 160 includes a rotatably attached inhibitor shaft 161; an inhibitor arm 162 attached to the inhibitor shaft 161 so as to be integrally rotatable therewith and to be pivotally moved in response to the rotation of the inhibitor shaft 161; and a torsional coil spring 163 which applies a biasing force to the inhibitor arm 162.

The shift drum 142 is formed on its outer circumferential face with an inhibitor groove 142*d* extending in the circumferential direction. A stopper 142*g* is formed in the inhibitor groove 142*d* so as to project radially outwardly. The inhibitor arm 162 is biased by the torsional coil spring 163 so that its leading end 162*b* is located inside the inhibitor groove 142*d.*

The inhibitor shaft 161 is a stepped shaft formed such that its right and left end sections 161*a*, 161*b* are larger in diameter than its central section 161*c*. The left end portion 161*b* of the inhibitor shaft 161 is inserted into a through-hole formed in the proximal end 162*a* of the inhibitor arm 162. The right end surface of the inhibitor arm 162 is abutted against and welded to the left end face of the central section 161*c*, so that the inhibitor arm 162 is integrally rotatable with the inhibitor shaft 161. The central section 161*c* of the inhibitor shaft 161 is carried by the right cover 9, the left end section 161*b* is carried by the right side surface of the right case 5, and the right end section 161*a* is exposed to the outside of a housing H described later.

A coil section 163*a* of the torsional coil spring 163 is wound around the central section 161*c* of the inhibitor shaft 161, which is received in the right auxiliary machinery chamber 25. One end portion 163*b* of the torsional coil spring 163 extends from one side of the coil section 163*a* of the torsional coil spring 163, and is retained between the right case 5 and a strainer 85 described later. The other end portion 163*c* of the torsional coil spring 163 extends from the other side of the coil section 163*a*, and is retained by a retaining groove 162*c* of the inhibitor arm 162. Both the end portions 163*b*, 163*c* are retained in this way, whereby the leading end 162*b* of the inhibitor arm 162 is biased against the inhibitor groove 142*d.* In this case, the inhibitor arm 162 abuts against a stopper portion 5*u* projecting from the inner wall face of the right case (see FIG. 8). This restricts the pivotal movement of the inhibitor arm 162 resulting from the biasing force of the torsional coil spring 162. This restriction prevents the leading end 162*b* of the inhibitor arm 162 from being abutted against the shift drum, allowing the shift drum to rotate smoothly.

As shown in FIG. 5, the right end section 161*a* of the inhibitor shaft 161 is partially cut away and is formed at its end with external thread. A reverse change arm 164 is fitted onto the right end section 161*a* and then a nut 165 is threaded to the right end section 161*a*. The reverse change arm 164 is thus fastened to the right end section 161*a* of the inhibitor shaft 161 so as to pivotally move in conjunction with the operation of a reverse lever not shown.

In the reverse inhibitor mechanism 160, the leading end 162*b* of the inhibitor arm 162 is located inside the inhibitor groove 142*d* when the reverse lever is not operated so that the reverse change arm 164 is located at a normal position. For this reason, even if the shift drum 142 is about to rotate in the direction of establishing the reverse stage, the leading end 162*b* of the inhibitor arm 162 abuts against the stopper 142*g* formed inside the inhibitor groove 142*d* so as to restrict the rotation of the shift drum 142. When the reverse lever is operated, the reverse change arm 164 is pivotally moved. Since the reverse change arm 164 is fastened to the right end section 161*a* of the inhibitor shaft 161, the pivotal movement of the reverse change arm 164 reliably turns the inhibitor shaft 161. When the inhibitor shaft 161 is rotated in conjunction with the reverse change arm 164, the inhibitor arm 162 is pivotally moved in the direction of arrow R2 in FIG. 6 so as to withdraw the leading end 162*b* to the outside of the inhibitor groove 142*d*. This permits the shift drum 142 to rotate in the direction of establishing the reverse stage. Thereafter, when the operation of the reverse lever is released, the inhibitor arm 162 is pivotally moved by the biasing force of the torsional coil spring, 163 to the position of restricting the rotation. Thus, the inhibitor arm 162 is restored to the state of restricting the rotation of the shift drum 142.

A description of the housing structure of the power unit P will be now described with additional reference to FIGS. 7 through 11. The housing (power unit case) H of the power unit P is configured to include the head cover 1, the cylinder head 2, the cylinder block 3, the right case 5, the left case 6, the right cover 9, the left cover 10 and the gear case 11. In addition, the housing H is configured to include the clutch cover 15, and a pump cover 17 attached from the right side to cover the opening portion of the right cover 9. The right case 5 and the left case 6 are joined together to integrally form the crankcase 4 and the transmission case 8 in the front-to-rear direction. The crankcase 4 and the transmission case 8 include front wall portions 5*c*, 6*c* and rear wall portions 5*d*, 6*d* which extend generally upward and downward, and upper wall portions 5*e*, 6*e* and lower wall portions 5*f*, 6*f* which extend generally backward and forward. The crankcase 4 and the transmission case 8 (the crank chamber 24 and the transmission chamber 28) are partitioned in the front-to-rear direction by arcuate central partition walls 5*g*, 6*g* (see FIGS. 8 and 9) disposed along the rotational trajectories of the crank webs 42*c*, 42*c*.

An oil storage chamber 35 is formed within the housing H below the transmission chamber 28. The line OL shown in FIG. 9 indicates an oil level OL encountered within the oil storage chamber 35 during vehicle travel on a horizontal surface. The oil storage chamber 35 is surrounded by the lower portion of the rear wall portions 5*d*, 6*d* and the lower wall portions 5*e*, 6*e* so as to store lubricating oil therein. The oil storage chamber 35 communicates with the transmission chamber 28 in an upward and downward direction, and also communicates with the crank chamber 24 via a communication space 4*b* located forward of and below the lower end of the central partition walls 5*g*, 6*g*.

Figure 7:
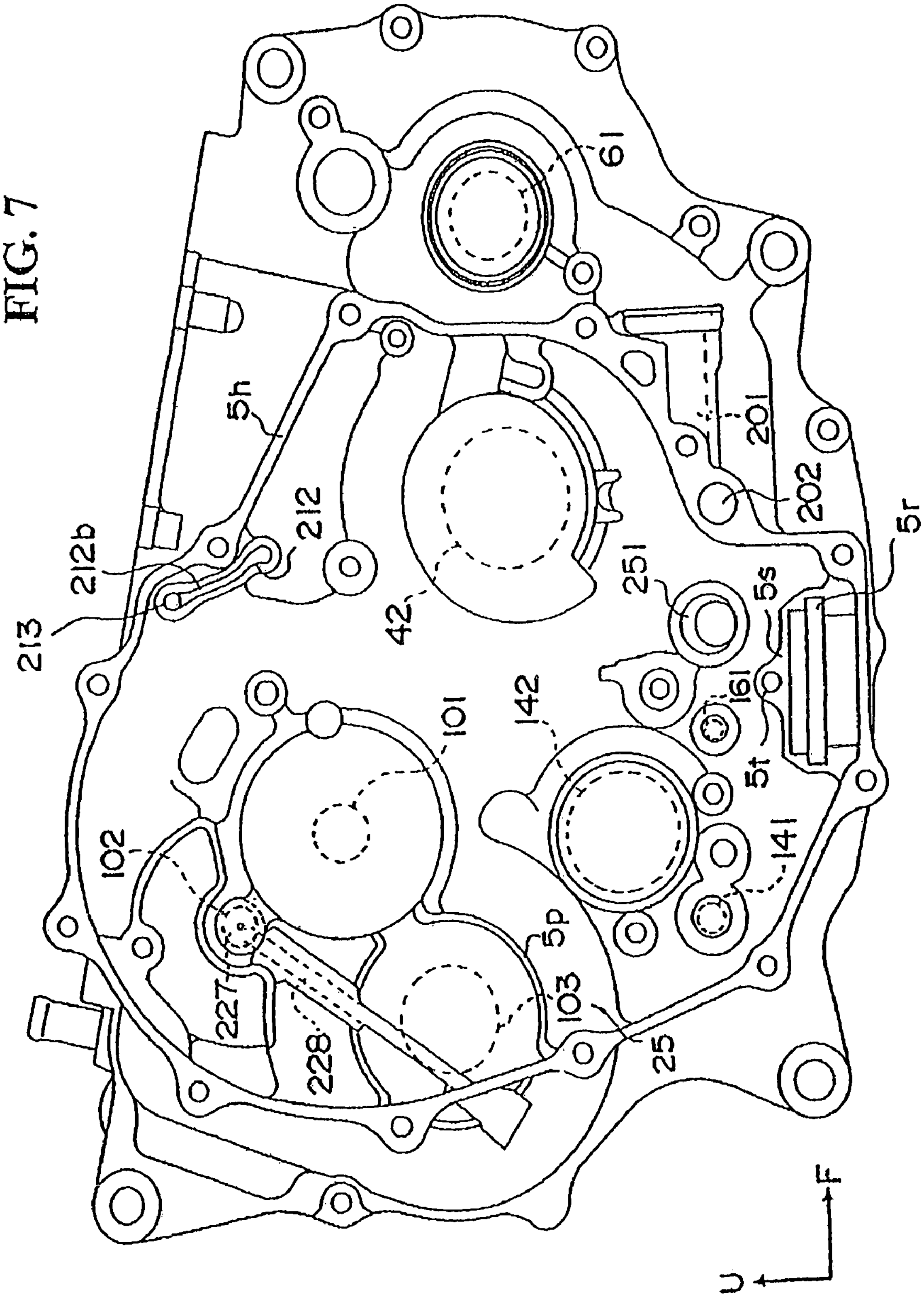
FIG. 7 is a right side view of the right case of the power unit of FIG. 1.
Figure 10:
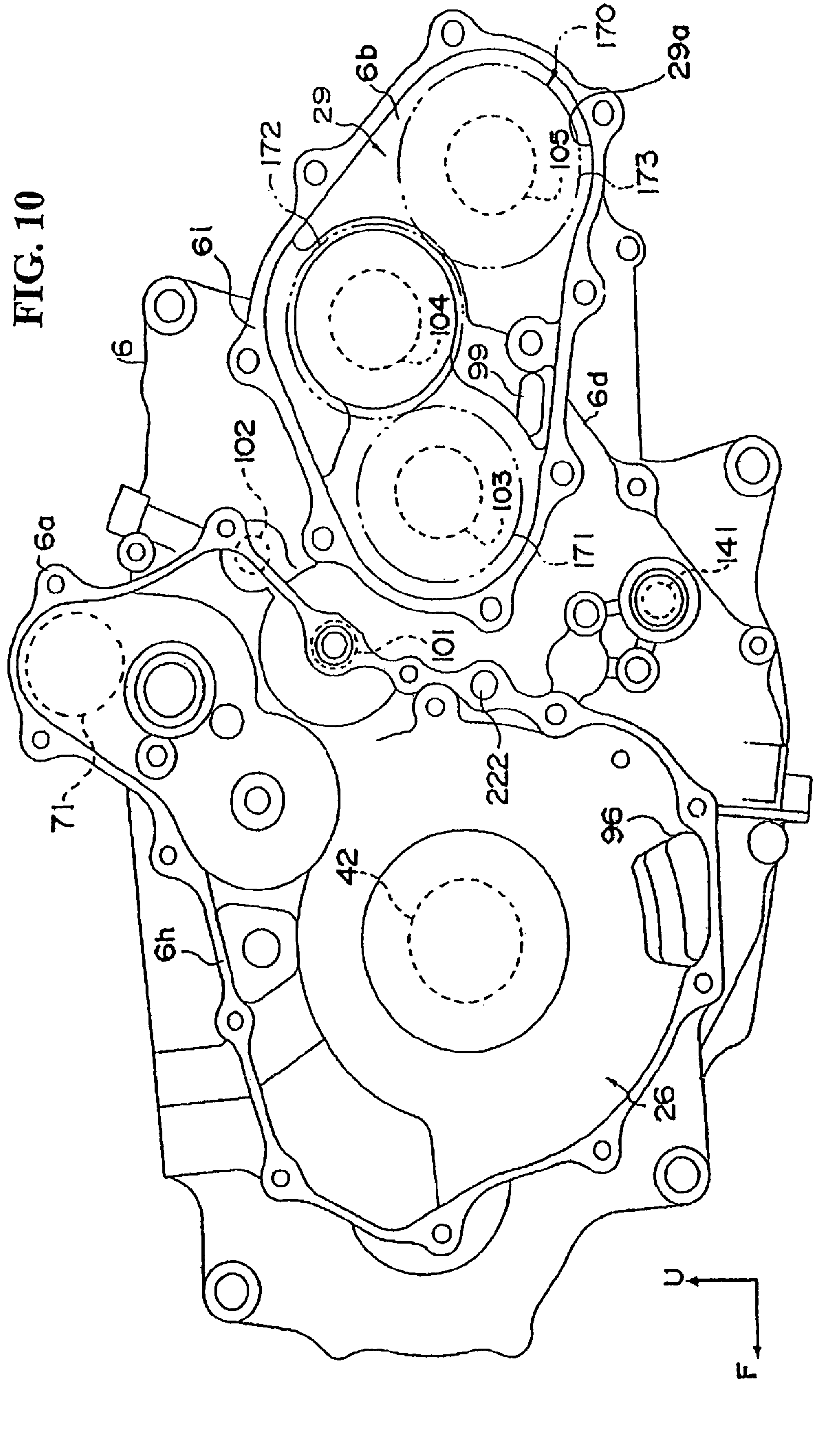
FIG. 10 is a left side view of the left case of the power unit of FIG. 1.

The right cover 9 is fastened to a cover mounting rib 5*h* formed to project from the right side surface of the right case 5 as shown in FIG. 7, and the left cover 10 is fastened to a cover mounting rib 6*h* formed to project from the left side surface of the left case 6 as shown in FIG. 10. The gear case 11 is fastened to the gear case attachment rib 6*i* formed to project from the rear of the left side face of the left case 6 as shown in FIG. 10.

A lubricating oil system of the power unit P is hereinafter described with reference to FIGS. 2 through 14. The lubricating oil system includes a strainer 85 (see FIGS. 6, 12 and 14), a feed pump 81 (see FIGS. 2 and 11), a scavenging pump 82 (see FIGS. 2, 11 and 14), and lubricating oil passages formed inside the housing H and shafts so as to direct lubricating oil through the power unit P. The strainer 85 is provided inside the oil storage chamber 35. The feed pump 81 feeds the lubricating oil stored in the oil storage chamber 35 to portions of the power unit P which need to be lubricated. The scavenging pump 82 draws in the lubricating oil stored in the oil storage chamber 35 via the strainer 85 and returns the lubricating oil to the oil storage chamber 35 again.

Referring to FIG. 2, each of the feed pump 81 and the scavenging pump 82 is a trochoid pump. A pump drive shaft 83 is adapted to drive both the pumps 81, 82, and rotors of the pumps 81, 82 are housed in the right cover 5. The pump drive shaft 83 is threaded to the right end of the crankshaft 42 and thus rotates integrally with the crankshaft 42. The feed pump 81 is provided on the right side of the scavenging pump 82. The pump cover 17 is attached to cover the rotor of the feed pump 81 from the right side thereof. An intake port 81*a* of the feed pump 81 is formed inside the right cover 9. A discharge port 81*b* is formed inside the pump cover 17. The scavenging pump 82 has an intake port 82*a* and a discharge port 82*b* both formed inside the right cover 9.

Referring to FIG. 12, the strainer 85 is composed of an almost rectangular sheet-like filter element 85*a* made of metal mesh, a core 85*a* made of a metal material and shaped like an almost-rectangular frame adapted to hold the filter element 85*a*, and a gasket 85*c* made of a rubber material and interposed between the core 85*b* and the filter element 85*a*.

The core 85*b* is formed integrally with a flat plate-like attachment bracket 85*d* which extends from one side of the rectangular frame in a direction normal to the plane in which the filter element 85*a* lies, that is, in a vertical direction relative to a direction of holding the filter element 85*a*. The attachment bracket 85*d* is formed with an circular hole 85*e* passing therethrough at a position above the central portion of the attachment bracket 85*d*. As shown in FIG. 12(*b*), the core 85*b* is formed with a retaining portion 85*f* which has the same thickness as the attachment bracket 85*d* and which projects from an end of the attachment bracket 85*d* obliquely outwardly (in a direction opposite to the direction of holding the filter element 85*a*).

Referring to FIG. 6, during assembly of the strainer 85 with the housing H, a portion of the strainer 85, denoted with symbol 85A in FIGS. 12(*a*) and 12(*c*) is first inserted from the right side into a strainer housing hole 5*r* formed above the lower wall portions 5*f*, 6*f* of the right case 5. Then, the strainer 85 is fitted into the strainer housing hole 5*r* while placing the attachment bracket 85*d*, extending vertically relative to the filter element 85*a*, into a position abutting against the upper wall portion 5*s* of the housing hole 5*r*. The upper wall surface 5*s* is formed with a bolt insertion hole 5*t* opening rightward outward of the right case 5. The strainer 85 is fastened to the right case 5 by a bolt threaded into the bolt insertion hole 5*t* via a circular hole 85*e* of the attachment bracket 85*d*. To complete the assembly, the portion attached with the strainer 85 is covered by the right cover 9.

With the strainer 85 fastened to the right case 5, the retaining portion 85*f*, formed on the attachment bracket 85*d*, projects upward from the upper wall portion 5*s* to face the shift change mechanism 140 and the reverse inhibitor mechanism 160. The retaining portion 85*f* and the right case 5 are designed to retain the one end portion 163*b* of the torsional coil spring 163 which, as described above, is included in the reverse inhibitor mechanism 160. An elongate portion 163*f* is formed so as to bend from the one end portion 163*b* of the torsional coil spring 163 and extend linearly therefrom. As shown in FIG. 6, the linear portion 163*d* of the elongate portion 163*f* extends toward the lower forward of the inhibitor shaft 161 and abuts against the left side face of the retaining portion 85*f* at its tip. A bent portion 163*e* of the elongate portion 163*f* is configured so as to bend and extend from the abutment portion between the linear portion 163*d* and the retaining portion 85*f* toward the leftward and forward upside thereof.

FIG. 6 shows the leading end 162*b* of the inhibitor arm 162 in a state in which it is located inside the inhibitor groove 142*d*. When the shift change lever is operated to pivotally move the inhibitor arm 162 together with the inhibitor shaft 161 in the direction of arrow R2, the one end portion 163*b* of the torsional coil spring 163 is pivotally moved rearward and upward. Even if the one end portion 163*b* is pivotally moved in this way, the one end 163*d* maintains a state where the bent portion 163*e* is constantly abutted against the side face of the retaining portion 85*f*. This is because the bent portion 163*e* is formed to extend from the abutment portion between the linear portion 163*d* and the retaining portion 85*f* toward the forward upside thereof before the pivotal movement. Thus, the coil portion 163*a* is compressed without moving axially on the inhibitor shaft 161.

A description is now provided of the lubricating oil passages formed inside the main shaft 101, the reverse idle shaft 102 and the counter shaft 103 among the lubricating oil passages as well as of the supporting structures for the shafts 101, 102 and 103, with reference to FIGS. 3 and 4.

Referring to FIG. 3, the main shaft 101 is formed having an axial oil passage 101*c* passing through the axial central portion and extending in the axial direction. In addition, the main shaft 101 is formed having a plurality of radial oil passages 101*d* extending radially outwardly from the axial oil passage 101*c*. The left end 101*b* of the main shaft 101 is supported by a bearing 181 received in a receiving hole 6*p* formed in the right side face of the left case 6. In this case, the left end face of the main shaft 101 is formed almost flush with the left end face of the bearing 181. The receiving hole 6*p* is formed as a stepped circular cylinder and the diameter of the cylindrical hole is smaller as it goes leftward. Thus, when the bearing 181 is received in the receiving hole 6*p*, an oil sump 219 communicating with the axial oil passage 101*c* is formed on the left side of the bearing 181 inside the receiving hole 6*p*.

Referring to FIG. 4, the reverse idle shaft 102 is formed having an axial oil passage 102*c* passing through the axial central portion and extending in the axial direction. In addition, the reverse idle shaft 102 is formed having a radial oil passages 102*j* extending radially outwardly from the axial oil passage 102*c*. Still further, the reverse idle shaft 102 is formed with a first and a second jet oil passage 102*f*, 102*g* which extend radially outward from the axial oil passage 102*c* and have a diameter smaller than the radial oil passage 102*j*.

Figure 13:
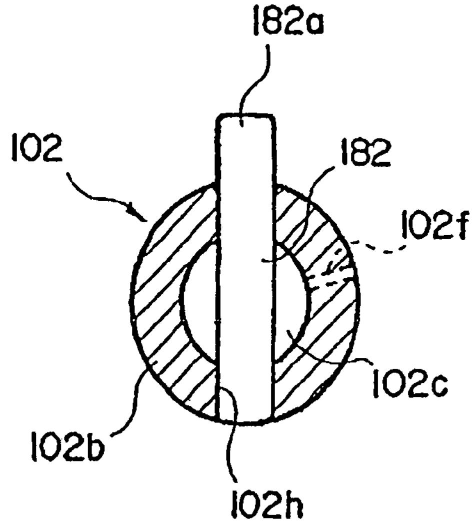
FIG. 13 is a sectional view of the reverse idle shaft taken along line XIV-XIV of FIG. 4 and viewed in the direction of the line arrows.

Referring to FIG. 13, the left end portion 102*b* of the reverse idle shaft 102 is formed with a through-hole 102*h* passing diametrically therethrough. A pin 182, having a length greater than the diameter of the reverse idle shaft, is press fitted into the through hole 102*h* in such a manner that its tip portion 182*a* projects from an opening of the through-hole 102*h*. The through-hole 102*h* and the pin 182 are each formed to have a sufficiently smaller diameter than the axial oil passage 102*c* to permit a free flow of lubricating oil about the pin 182 through the axial oil passage 102*c*.

The reverse idle shaft 102 has a right end 102*a* which is press fitted into a hole formed in the left side face of the right case 5 and a left end 102*b* which press fitted into a hole formed in the right side face of the left case 6. Thus, the axial oil passage 102*c* communicates, through a right end opening 102*d*, with an oil sump 227 formed inside the hole into which the right end 102*a* is press fitted. Similarly, the axial oil passage 102*c* communicates, through a left end opening 102*e*, with an oil sump 226 formed inside the hole into which the left end 102*b* is press fitted. The left case 6 is formed in its right side face with a retaining groove 6*q* extending radially outwardly from the hole into which the left end 102*b* of the reverse idle shaft 102 is press fitted. When the left end 102*b* of the reverse idle shaft 102 is press fitted into the left case 6, the tip portion 182*a* of the pin 182 is fitted into the retaining groove 6*q*. In this way, the reverse idle shaft 102 is attached so as to be circumferentially positioned (fixed) with respect to the transmission case 8.

By fixing the position of the reverse idle shaft 102 with respect to the transmission case, it is ensured that the first jet oil passage 102*f* faces the meshing portion of the fifth speed gear train G5 and the second jet oil passage 102*g* faces the meshing portion of the fourth speed gear train G4. In addition, the reverse idle gear shaft 102 is located above and between the main shaft 101 and the counter shaft 103 in the front-to-rear direction. Therefore, the respective openings of the first and the second jet oil passage 102*f*, 102*g* face substantially downward.

The reverse idle shaft 102 is subjected to cutting work to be accurately form the through-hole 102*h* of circular in cross-section therein, while the pin is provided with increased dimensional accuracy. The pin 182 is press fitted into the through-hole 102*h* such that backlash (chattering) is prevented, while the backlash between the pin 182 and the retaining groove 6*q* is reduced. Thus, the reverse idle shaft 102 can be accurately circumferentially, and also axially, positioned with respect to the transmission case 8. In addition, the openings of the first and second jet oil passages 102*f*, 102*g* can be oriented toward the respective targeted directions.

As shown in FIG. 3, the counter shaft 103 is formed having an axial oil passage 103*c* which passes through the axial central portion and extends in the axial direction from the right end thereof and which is closed at its left-hand portion. A plurality of radial oil passages 103*d* (103*f*) are formed to extend radially from the axial oil passage 103*c*. Incidentally, a radial oil passage 103*f* located on the leftmost side opens inward of the final gear chamber 29 in the assembled state as shown in FIG. 2 and is also called "the final gear chamber supply oil passage 103*f*" in the description below.

The right end 103*a* of the counter shaft 103 is supported by a bearing 183 received in a receiving hole 5*p* formed in the right case 5. In this instance, the right end of face of the counter shaft 103 is formed flush with the right end face of the bearing 183. The receiving hole 5*p* is formed as a stepped circular cylinder and the diameter of the cylindrical hole is smaller as it goes rightward. Thus, in the state where the bearing 183 is received in the receiving hole 5*p* and the counter shaft 103 is supported, an oil sump 229 is formed on the right side of the bearing 183 inside the receiving hole 5*p* so as to communicate with the axial oil passage 103*c* via a right end opening 103*e*.

The fork shaft 146 shown in FIG. 4 is a stationary shaft whose ends are both press fitted into respective holes formed in the inside surface of the transmission case 8. A left end 146*b* of the fork shaft 146 is press fitted into a hole formed in the right side face of the left case 6, and an oil sump 221 is formed inside the hole.

Figure 11:
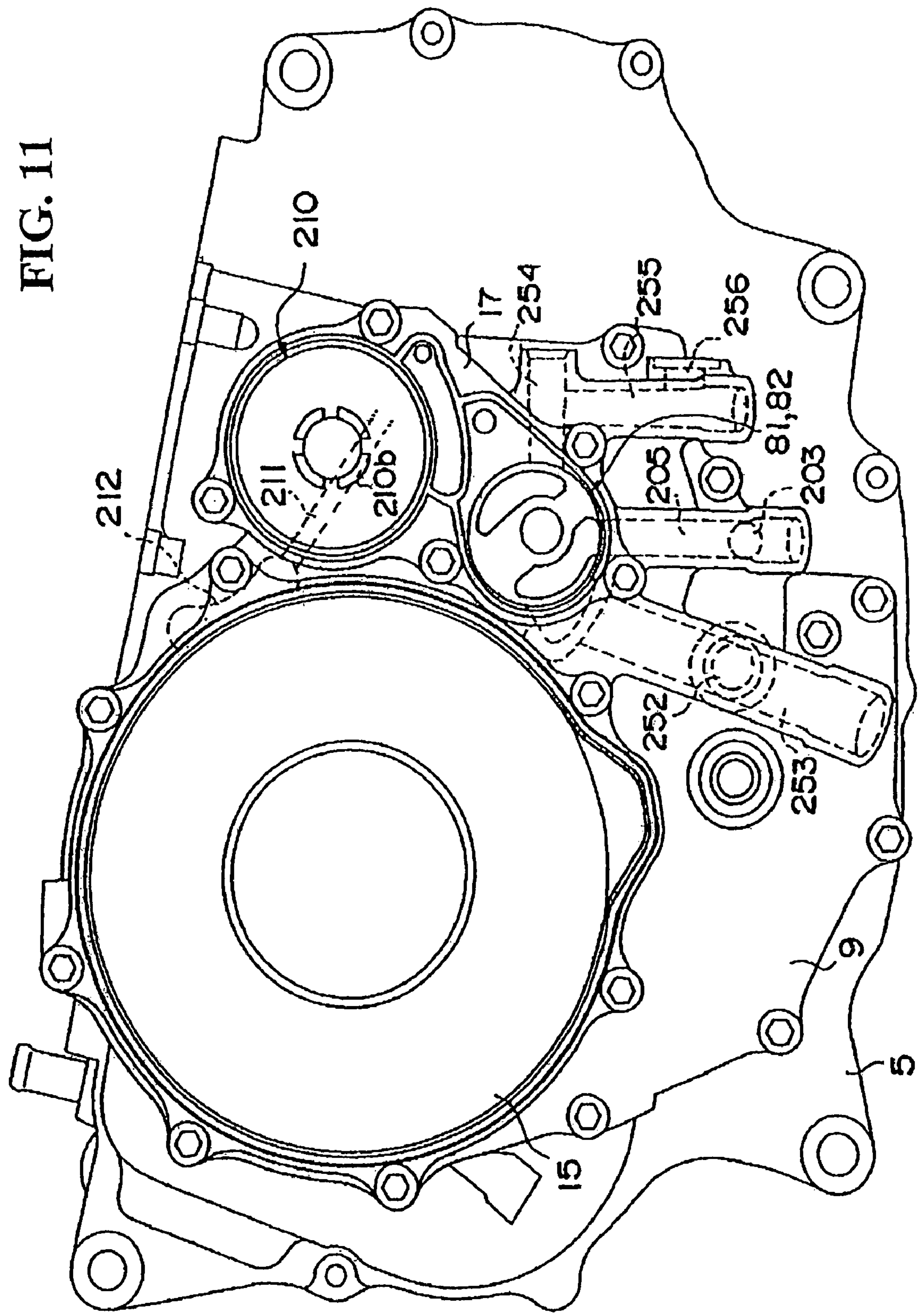
FIG. 11 is a right side view of the right case of the power unit of FIG. 1, fitted with a right cover, a clutch cover and a pump cover.

The lubricating oil passages formed inside the housing H will now be described. As shown in FIG. 7, an oil passage 201 is formed inside the right case 5 so as to extend from a location below and extending outward and rearward of the cover attachment rib 5*h* to a location inward and forward of the cover attachment rib 5*h*. An oil passage 202 communicates with oil passage 201 and is formed to extend from the oil passage 201 to the right through the cover attachment rib 5*h* and to open in a mating face with the right cover 9. A line connected to the oil storage chamber 35 is connected to the outer opening of the oil passage 201. As shown in FIG. 11, the right cover 9 is formed with an oil passage 203 which extends in the left-to-right direction, and opens in a mating face with the right case 5. When the right cover 9 is joined to the right case 5, the respective openings of the oil passages 202, 203 are aligned with each other, permitting communication therebetween. The oil passage 203 communicates with an oil passage 205 which extends substantially vertically inside the right cover 9. The oil passage 205 communicates at its upper end with an intake port 81*a* of the feed pump 81. The discharge port of the feed pump 81 communicates with the oil filter 210 via an inner oil passage of the pump cover 17. An output port 210*b* of an oil filter 210 communicates with an oil passage 211 extending inside the right cover 9. The oil passage 211 communicates at its front upper end with an oil passage 212 which further extends toward the front upside.

The oil passage 212 communicates at its front upper end with an oil passage 213 which extends inside the right case 5 in the left-and-right direction. The oil passage 213 communicates with a bolt insertion hole, which is formed in the circumferential edge of a fitting hole 4*a* used to connect the cylinder block 3 with the crankcase 4. In addition, the oil passage 213 communicates with the front end of an oil passage 214, which extends in the front-to-rear direction along the upper wall portion 5*e* inside the right case 5. The oil passage 214 communicates at its rear end with an oil passage 215 formed to extend in the left-and-right direction.

Figure 8:
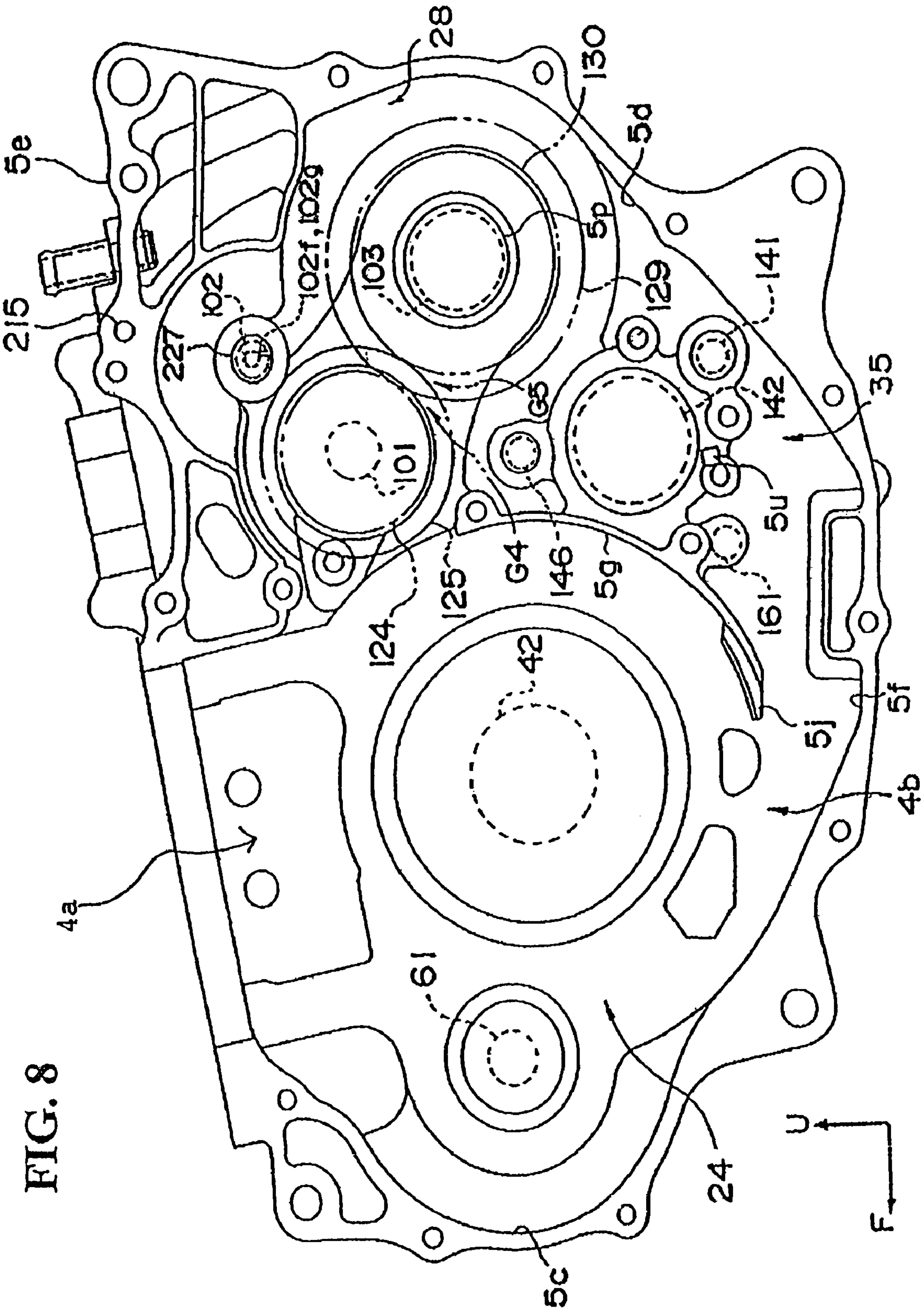
FIG. 8 is a left side view of the right case of the power unit of FIG. 1.
Figure 9:
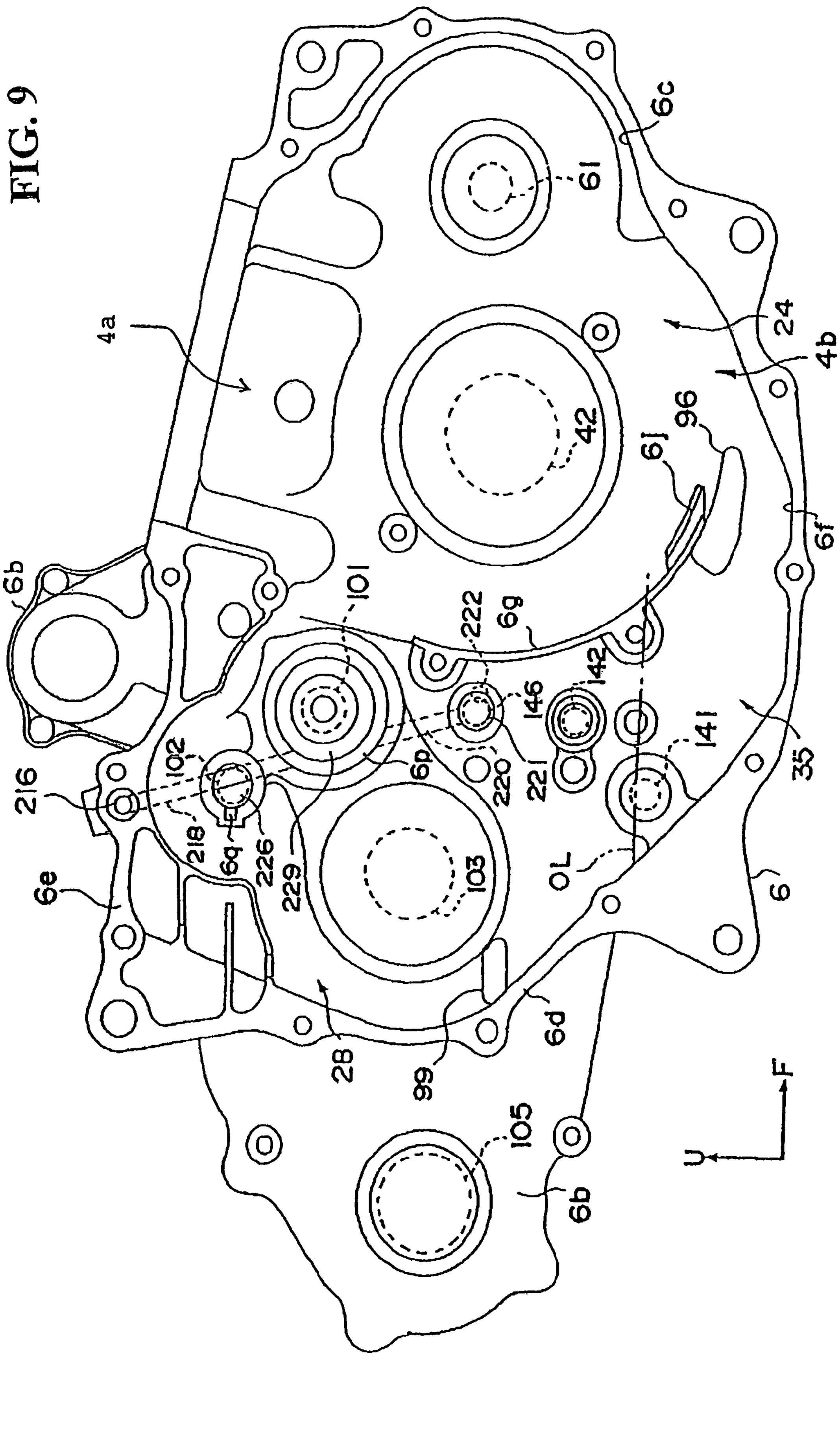
FIG. 9 is a right side view of a left case of the power unit of FIG. 1.

As shown in FIG. 8, the oil passage 215 opens in a mating surface of the upper wall portion 5*e* with the left case 6. As shown in FIG. 9, an oil passage 216 is formed inside the left case 6 so as to extend in the left-and-right direction and open in a mating surface of the upper wall portion 6*e* with the right case 5. When the right case 5 and the left case 6 are joined together, the respective openings of the oil passages 215, 216 are aligned with each other as shown FIG. 4.

Referring to FIGS. 4 and 9, the oil passage 216 communicates with an oil passage 218 which extends diagonally downward toward the front in the left inside of the left case 6. The oil passage 218 communicates with the oil sump 226 formed inside the hole into which the left end portion 102*b* of the reverse idle shaft 102 is press fitted. In addition, the oil passage 218 further communicates with the oil sump 219 formed inside the receiving hole 6*p* adapted to receive the bearing 181 attached therein which supports the left end portion 101*b* of the main shaft 101. An oil passage 220 is formed to extend from the oil sump 219 of the main shaft 101 along the extension of the oil passage 218. The oil passage 220 communicates at its front lower end with the oil sump 221 formed in the hole into which the left end portion 146*b* of the fork shaft 146 is press fitted.

Referring to FIGS. 4, 9 and 10, the oil sump 221 communicates with an oil passage 222 which extends in the left-and-right direction inside the cover attachment rib 6*h* of the left case 6 and opens in a mating surface with the left cover 10. Referring to FIG. 4, the left cover 10 is formed with an oil passage 223 which extends in the left-and-right direction and opens in a mating surface with the left cover 6. When the left case 6 and the left cover 10 are joined together, the respective openings of the oil passages 222, 223 are aligned with each other. As shown in FIGS. 2 and 4, the oil passage 223 communicates with an oil passage 225, which opens inside the left auxiliary machinery chamber 26.

With reference to FIGS. 3 and 4, the oil sump 219 communicates with the axial oil passage 101*c* of the main shaft 101. The right end opening of the axial oil passage 101*c* is closed. The oil sump 226 communicates with the axial oil passage 102*c* of the reverse idle shaft 102 via a left end opening 102*e*. The axial oil passage 102*c* communicates with the oil sump 227 formed in the hole into which the right end 102*a* of the reverse idle shaft 102 is press fitted through the right end opening 102*d*. As shown in FIGS. 3 and 7, the oil sump 227 communicates with an oil passage 228 extending diagonally rearward and downward. The oil passage 228 communicates with the oil sump 229 formed inside the receiving hole 5*p* adapted to receive the bearing 183 supporting the right end 103*a* of the counter shaft 103. The oil sump 229 communicates with the axial oil passage 103*c* of the counter shaft 103 via the right end opening 103*e*.

Figure 14:
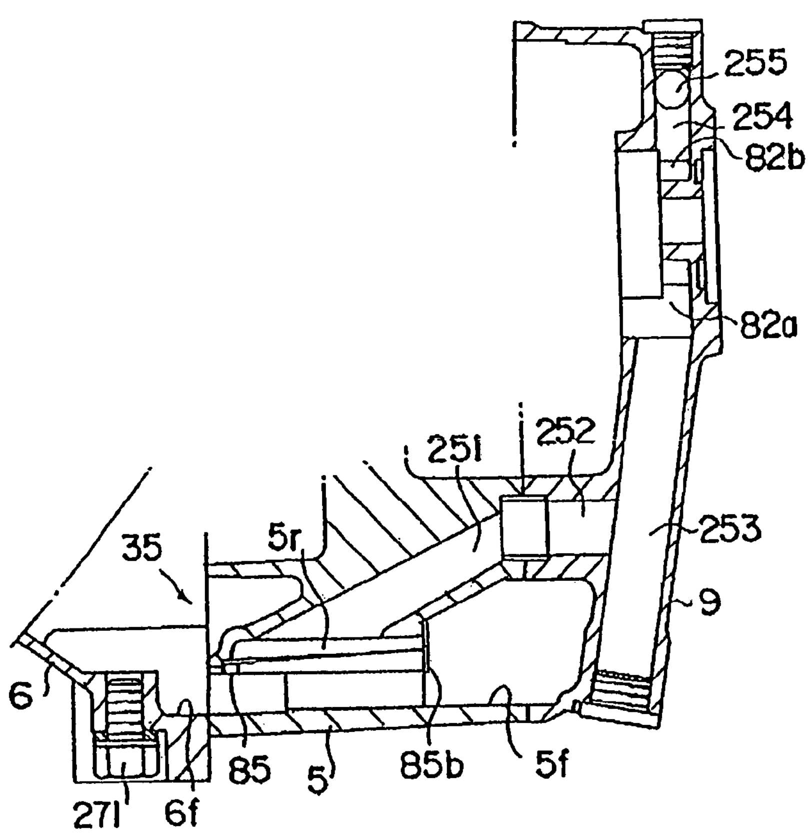
FIG. 14 is a sectional view of a portion of the power unit, showing oil passages connected to a scavenging pump.

Referring to FIGS. 6 and 14, an oil passage 251 is formed inside the right case 5 so as to extend rightward and upward from the receiving hole 5*r* adapted to receive the strainer 85 therein. An oil passage 252 is formed inside the right cover 9 so as to extend in the left-and-right direction. When the right case 5 and the right cover 9 are joined together, the respective openings of the oil passages 251, 252 are aligned with each other. Referring to FIGS. 11 and 14, the oil passage 252 communicates with an oil passage 253 which extends substantially vertically inside the right cover 9. The oil passage 253 communicates at its upper end with the intake port 82*a* of the scavenging pump 82. The discharge port 82*b* of the scavenging pump 82 communicates with an oil passage 254 which extends rearward inside the right cover 9. As shown in FIG. 11, an oil passage 255 is formed inside the right cover 9 so as to extend substantially vertically in the rear portion, communicating with the oil passage 254. In addition, an oil passage 256 is formed inside the right cover 9 so as to extend rearward from the oil passage 255. The oil passage 256 is connected at its rear end opening to a line connected to the oil storage chamber 35. As shown in FIG. 14, a drain bolt 271 is threaded into the lower wall portion 6*f* of the left case 6. The lubricating oil stored in the oil storage chamber 35 can be discharged by removing the drain bolt 271.

In the power unit P having the lubricating oil passages described above, when the engine E is running, the crankshaft 42 rotates, and thus the pump drive shaft 83 is rotated to drive the rotors of the feed pump 81 and the scavenging pump 82. When the feed pump 81 is operated, the lubricating oil stored in the oil storage chamber 35 is allowed to flow in the oil passage 201, is drawn into the intake port 81*a* of the feed pump 81, and discharged from the discharge port 81*b*. The lubricating oil discharged from the discharge port 81*b* is filtered by the oil filter 210 and directed from the inside of the right cover 9 to the inside of the right case 5 via the oil passage 212. The lubricating oil is further directed through the oil passages 215, 216 to the inside of the left case 6. The lubricating oil fed to the oil passage 218 is fed through the oil sump 226 to the axial oil passage 102*c* of the reverse idle shaft 102. The lubricating oil is further fed through the oil sump 219 to the axial oil passage 101*c* of the main shaft 101 and to the oil passage 220.

As shown in FIG. 3, the lubricating oil fed to the axial oil passage 102*c* of the reverse idle shaft 102 is fed through the radial oil passage 102*j* to the joining portion between the reverse idle gear 132 and the reverse idle shaft 102. In addition, as shown in FIG. 8, the lubricating oil fed to the axial oil passage 102*c* is sprayed through the first jet oil passage 102*f* on the meshing portion between the fifth speed drive gear 125 and the fifth speed driven gear 130. Similarly, the lubricating oil is sprayed through the second jet oil passage 102*g* on the meshing portion between the fourth speed drive gear 124 and the fourth speed driven gear 129. The lubricating oil thus fed to the joining portion and the meshing portions is discharged inside the transmission chamber 28.

The lubricating oil directed to the axial oil passage 102*c* of the reverse idle shaft 102 is fed through the oil sump 227 to the oil passage 228 and then through the oil sump 229 to the axial oil passage 103*c* of the counter shaft 103. The lubricating oil fed to the axial oil passage 103*c* of the counter shaft 103 is fed through the radial oil passages 103*d* to the joining portion between the counter shaft 103 and each of the first speed driven gear 126, the reverse driven gear 133, the third speed driven gear 128, the third shift sleeve 138, the fifth speed driven gear 130 and the second speed driven gear 127. The lubricating oil thus fed to the joining portions is discharged inside the transmission chamber 28.

Referring to FIG. 2, the lubricating oil fed to the axial oil passage 103*c* of the counter shaft 103 is discharged inside the final gear chamber 29 through the final gear chamber supply oil passage 103*f* formed in the left end portion 103*b*.

Referring to FIG. 3, the lubricating oil fed to the axial oil passage 101*c* of the main shaft 101 is fed through the radial oil passages 101*d* to the joining portion between the main shaft 101 and each of the primary driven gear 112, the fourth speed drive gear 124, the fifth speed drive gear 125 and the first shift sleeve 136. The lubricating oil thus fed to the joining portions is discharged inside the transmission chamber 28.

As shown in FIGS. 2 and 4, the lubricating oil fed to the oil passage 220 is directed from the inside of the left case 6 to the inside of the left cover 10 and then discharged from an oil passage 225 into the left auxiliary machinery-chamber 26. A portion of the lubricating oil discharged from the feed pump 81 is directed through a tube 84 to an oil passage 267 formed inside the crankshaft. The lubricating oil directed to the oil passage 267 is fed to the connecting portion between a connecting pin 42*d* and a connecting rod 44 and then discharged inside the crank chamber 24.

The lubricating oil discharged in the crank chamber 24 is returned to the oil storage chamber 35 via the communication space 4*b* located below the front lower portion of the crank chamber 24. At this time, the lubricating oil discharged in the crank chamber 24 is circumferentially raked out by the rotating crank webs 42*c*, 42*c*. The central partition walls 5*g* and 6*g* include oil collecting ribs 5*j* and 6*j*, respectively formed at their lower ends, which are designed to collect the lubricating oil raked out and circumferentially splashed by the crank webs 42*c*, 42*c*. The lubricating oil thus collected is effectively returned to the oil storage chamber 35 via the communication space 4*b*.

Referring to FIGS. 9 and 10, the lubricating oil discharged in the left auxiliary machinery chamber 26 is returned to the oil storage chamber 35 through a first communicating port 96. The first communicating port 96 is formed at the side lower portion of the left case 6 so as to permit the lower portion of the left auxiliary machinery chamber 26 to communicate with the oil storage chamber 35. The lubricating oil discharged in the transmission chamber 28 flows directly downward in the oil storage chamber 35 located below.

The lubricating oil discharged in the final gear chamber 29 through the final gear chamber supply oil passage 103*f* is jettedly supplied to the final drive gear 171 and the final idle gear 172. An internal rear lower portion 29*a* of the final gear chamber 29 is downwardly concave so as to extend along the outer profile of the final driven gear 173. A portion of the lubricating oil that is discharged in the final gear chamber 29 reaches the recession of the rear lower portion 29*a*, and is raked up by the final driven gear 173, lubricating the final gear train 170.

Referring to FIGS. 9 and 10, the left case 6 is formed in the side rear portion thereof with a second communicating port 99 which allows the front-rear central lower portion (namely, below the final idle shaft 104) of the final gear chamber 29 to communicate with the rear portion of the transmission chamber 28. Most of the lubricating oil discharged in the final gear chamber 29 collects on the bottom of the final gear chamber 29 and then is returned to the transmission chamber 28 through the second communicating port 99. The second communicating port 99 is located at a position close to the rear wall portion 6*d* of the left case 6 and to the lower wall portion of the gear case attachment rib 6*i*, and is adjacent to the bottom surface of the final gear chamber 29. The rear wall portion 6*d* of the left case 6, as well as the rear wall portion 5*d* of the right case 5, extends obliquely downwardly and forwardly toward the oil storage chamber 35. Thus, the lubricating oil discharged from the final gear chamber 29 through the second communicating port 99 to the transmission chamber 28 runs along the rear wall portions 5*d*, 6*d*, flows downward inside the transmission chamber 28 and is directed to the oil storage chamber 35.

As described above, in the configuration of the embodiment, the reverse idle shaft 102 constituting part of the transmission M is formed with the axial passage 102*c*, and the first and the second jet oil passage 102*f*, 102*g*. Both the ends 102*a*, 102*b* of the reverse idle shaft 102 are supported by the half-split transmission case 8. The axial oil passage 102*c* is allowed to communicate with the oil passages 218 and 228 (the oil sumps 226 and 227) formed inside the right case 5 and the left case 6, respectively. The respective openings of the first and the second jet oil passage 102*f*, 102*g* is made to face the respective meshing portions of the fourth and the fifth speed gear trains G4 and G5 among the forward stage setting gear trains provided between the main shaft 101 and the counter shaft 103.

Thus, the lubricating oil is sprayed from the reverse idle shaft 102 to the meshing portions of the gear trains constituting the transmission M, which makes it possible to effectively lubricate the speed change gear trains. The member forming the oil passage adapted to lead lubricating oil from the inner oil passage of one of the case halves to the inner oil passage of the other, and the member adapted to spray the lubricating oil to the speed change gear trains are not dedicated members but are provided within the shafts of the transmission M. Therefore, the transmission M and the lubricating device, both of which have the above effects is configured while reducing the number of component parts.

The pin 182 is attached to the end of the reverse idle shaft 102 in such a manner that its tip portion 182*a* projects radially outward beyond a periphery of the reverse idle shaft 102. When the reverse idle shaft 102 is fastened to the transmission case 8, the tip portion 182*a* of the pin 182 is fitted into the retaining groove 6*q* formed in the inner surface of the transmission case 8. Thus, this simple configuration effectively restricts the rotation of the reverse idle shaft 102 relative to the transmission case 8. In addition, this configuration permits the reverse idle shaft 102 to be accurately circumferentially positioned with respect to the transmission case 8. Thus, the openings of the first and second jet oil passages 102*f*, 102*g* are surely oriented toward the respective targeted directions.

The left end opening 102*e* of the axial oil passage 102*c* of the reverse idle shaft 102 communicates with the oil passage 218 (and the oil sump 226) connected to the discharge port 81*b* of the feed pump 81. In addition, the right end opening 102*d* of the reverse idle shaft 102 communicates with the oil passage 228 (and the oil sump 227) connected to the right end opening 103*e* of the axial oil passage 103*c* of the counter shaft 103. Thus, the axial oil passage 102*c* of the reverse idle shaft 102 is located on the upstream side of lubrication oil flow, whereas the axial oil passage 103*c* of the counter shaft 103 is located on the downstream side. This makes it possible for higher pressurized lubricating oil to be sprayed on the meshing portions of the speed change gear trains. In addition, the lubricating oil reduced in pressure resulting from the jet spray is fed to the gears or the like provided on the counter shaft 103. In this way, the lubricating oil can be effectively fed according to the hydraulic pressure.

As shown in FIG. 8, the reverse idle shaft 102, which extends in the left-to-right direction, is disposed above and between the main shaft 101 and the counter shaft 103 in the front-to-rear direction. The meshing portions of the first to fifth speed gear trains G1 to G5 for establishing the forward stages of the speed change gear trains are located below the reverse idle shaft 102. In addition, the first and the second jet oil passage 102*f*, 102*g*, are arranged to direct jetted oil substantially downward from the axial oil passage 102*c*. With such arrangement of the shafts, the lubricating oil can be energetically sprayed downward from the first and the second jet oil passage 102*f*, 102*g*, thereby effectively lubricating the speed change gear trains.

The counter shaft 103 and the output shaft 105 are juxtaposed in the front-to-rear direction and the final idle shaft 104 is located above and between the counter shaft 103 and the output shaft 105 in the front-to-rear direction. In the embodiment, the counter shaft 103 and the output shaft 105 are located at respective positions higher than the crankshaft 42. The oil storage chamber 35 is formed to be located below the crank chamber 24 housing the crankshaft 42. Thus, a difference in height between the oil storage chamber 35 and the second communicating port 99, which allows the final gear chamber 29 to communicate with the transmission chamber 28, is increased. This increased difference in height enables the lubricating oil discharged in the final gear chamber 29 to be quickly discharged toward the oil storage chamber 35. In addition, the increased difference in height also reduces the possibility that the lubricating oil will be returned from the oil storage chamber 35 toward the final gear chamber 29. This reduces the amount of lubricating oil collecting in the final gear chamber 29, which reduces the stirring resistance of the final gear trains 170. Since the amount of the lubricating oil in the oil storage chamber 35 is stable, a disadvantage is eliminated whereby the feed pump 81 produces air lock. Since the second communicating port 99 is provided at a central portion in the front-to-rear direction of the final gear chamber 29, the vertical position of the second communicating port 99 is stable with respect to the level of the lubricating oil. Even if the level of the lubricating oil in the final gear chamber 29 is tilted in the front-to-rear direction due to traveling of the vehicle on a slope, it is easy to discharge the lubricating oil from the second communicating port 99.

The lubricating oil discharged in the final gear chamber 29 collects on the bottom at least at a height of the second communicating port 99 without being discharged therefrom. In this embodiment, since the second communicating port 99 is adjacent to the lower wall portion of the gear case attachment rib 6*i*, the minimum amount, per se, of lubricating oil collecting in the final gear chamber 29 is reduced, which stabilizes the amount of the lubricating oil in the oil storage chamber 35.

The second communicating port 99 is formed adjacently to the inner surface of the rear wall portion 6*d* of the left case 6, which extends forwardly and downwardly at an angle from the transmission chamber 28 toward the oil storage chamber 35, which is below the transmission chamber 28. The lubricating oil discharged through the communicating hole 99 to the transmission chamber 28 can be therefore returned to the oil storage chamber 35 while running along the inner surface of the rear wall portion 6*d*. Thus, even if the increased difference in height between the second communicating port 99 and the oil storage chamber 35 is ensured, the lubricating oil discharged in the transmission chamber 28 will not directly drop in the oil storage chamber 35 to otherwise foam the lubricating oil stored in the oil storage chamber 35. This can reduce the possibility that the feed pump 81 produces air lock.

When the gear case 11 is removed, the respective right ends of the counter shaft 103, the final idle shaft 104 and the output shaft 105 appear while being intactly retained on the side of the left case 6. The final gear train 170, together with the second communicating port 99, is exposed to the left side of the vehicle. Thus, the final gear train 170 is easily removed and replaced with another. Maintenance of the final gear train 170 and customization such as the change of the reduction ratio of the transmission M are easily performed. In addition, the maintenance of the peripherals of the second communicating port 99 is easily performed.

The strainer 85 is fitted into and attached to the receiving groove 5*r* formed in the right case 5 and then fastened to the right case 5. This will prevent the strainer 85 from dropping easily and make it easier to attach the strainer 85. The one end portion 163*b* of the torsional coil spring 163 constituting part of the reverse inhibitor mechanism 160 is retained by the retaining portion 85*f* formed integrally with the attachment bracket 85*d* of the strainer 85. In this way, since the strainer 85 is reliably fastened, the torsional coil spring 163 is also reliably fastened. In addition, it is not necessary to otherwise form a rib or groove in the inner surface of the housing H to retain the torsional coil spring as in the traditional way, which can enhance the manufacturability of the housing H.

The one end portion 163*b* of the torsional coil spring 163 is formed to include the linear portion 163*d* extending from the coil portion 163*a* and the bent portion 163*e* which bends at the tip of the linear portion 163*d*. Even if the retaining portion 85*f* of the attachment bracket 85*d* is formed like a flat plate, it is maintained that the one end portion 163*b* of the torsional coil spring 163 constantly abuts against the retaining portion 85*f*. The forming work of the attachment bracket 85*d* is simplified to enhance the manufacturability of the strainer 85. Further, the retaining portion 85*f* is formed to project from the filter element 85*a*. Therefore, the bent portion 163*e* of the torsional coil spring 163 and the like can be attached without interference with the strainer and others, which makes it possible to smoothly operate the reverse inhibitor mechanism 160.

In order to reduce the size of the reverse inhibitor mechanism 160 configured by retaining the torsional coil spring 163 at the strainer 85, it is necessary to bring the constituent members of the shift change mechanism 140, including the shift drum 142, close to the vicinity of the oil storage chamber 35. The shift change mechanism 140 is a mechanism for changing the setting of the speed change stage and is not a part of the power transmission path. Thus, the arrangement of the shift change mechanism 140 close to the oil storage chamber 35 does not influence the power transmission efficiency, so that the reverse inhibitor mechanism 160 may be reduced in size.

The strainer 85 is inserted for attachment from the right side into the receiving hole formed in the right case 5 and fastened to the right case 5 via a bolt inserted into the bolt insertion hole 5*t* opening in the right side face of the right case 5. The strainer 85, in the assembled state, is covered by the right cover 9. Thus, the strainer 85 can be easily removed and replaced with another only by removing the right cover 9, facilitating maintenance of the strainer 85.

While a working example of the present invention has been described above, the present invention is not limited to the working example described above, but various design alterations may be carried out without departing from the present invention as set forth in the claims.

What is claimed is:

1. A power unit for a vehicle, the power unit comprising an internal combustion engine and a transmission, the internal combustion engine comprising a crankshaft rotatably supported in a crankcase, the crankcase adapted to receive part of the transmission, the crankcase formed with an oil storage portion located in an inner lower side thereof, the oil storage portion adapted to collect lubricating oil, the transmission transmitting the rotation of the crankshaft to vehicle wheels, the transmission comprising:

a gear chamber supported by the crankcase;

an input shaft, an intermediate shaft and an output shaft which are housed in the gear chamber; and gear trains executing power transmission among the input shaft, the intermediate shaft and the output shaft, wherein a communicating port extends between the crankcase and the gear chamber, the communicating port being formed in one side face of the crankcase and allowing the gear chamber to communicate with a crank chamber, the lubricating oil fed to the gear chamber is discharged through the communicating port to the inside of the crankcase and returned to the oil storage portion, the input shaft and the output shaft are arranged so that a line connecting a shaft center of the input shaft and a shaft center of the output shaft extends substantially horizontally, the intermediate shaft is disposed above and between the input shaft and the output shaft, and the communicating port is disposed below the intermediate shaft.

2. The power unit according to claim 1, wherein the communicating port is formed adjacent to a wall surface extending downward toward the oil storage portion.

3. The power unit according to claim 2, wherein the wall surface extends obliquely downward and forward toward the oil storage portion, and communication port is positioned with respect to the wall surface such that lubricating oil discharged from the communication port flows toward the oil storage portion along the wall surface.

4. The power unit according to claim 1, wherein the communicating port is disposed adjacent to a bottom surface of the gear chamber.

5. The power unit according to claim 4, wherein the communication port is positioned on the case at a location above an oil level of the oil storage portion which occurs during vehicle travel on a horizontal surface.

6. The power unit according to claim 1, wherein the gear chamber is formed inside a gear case, and the gear case is attached to one side face of the crankcase so as to cover a portion of the one side face of the crankcase, the input shaft receives the rotation of crankshaft after the rotation has been changed in speed, and the output shaft comprises a drive shaft which directly transmits rotation to the wheels, and among gears constituting the gear trains, at least a drive gear is provided on the input shaft, and an idle gear is provided on the intermediate shaft configured to mesh with the drive gear, wherein the drive gear and the idle gear are housed in the gear chamber.

7. The power unit according to claim 1, wherein the line connecting the shaft center of the input shaft and the shaft center of the output shaft extends above the communicating port.

8. The power unit according to claim 1 wherein when the power unit is mounted on a vehicle, the input shaft and the output shaft are disposed at locations which are higher than the crankshaft, the oil storage portion is disposed at a location below the crankshaft, and the communication port is disposed at a location closer to the input shaft and the output shaft than to the oil storage portion.

9. A power unit for a vehicle, the power unit comprising an internal combustion engine and a transmission, the internal combustion engine comprising a crankshaft rotatably supported in a crankcase, the crankcase adapted to receive part of the transmission, the crankcase formed with an oil storage portion located in an inner lower side thereof, the oil storage portion adapted to collect lubricating oil, the transmission transmitting the rotation of the crankshaft to vehicle wheels, the transmission comprising:

a gear chamber supported by the crankcase;

a main shaft and a reverse idle shaft which are housed in said crankcase;

an input shaft, one end of which is housed in said crankcase, the other end of which is housed in the gear chamber;

an intermediate shaft and an output shaft which are housed in the gear chamber;

a primary gear train executing transmission of rotation between the crankshaft and the main shaft;

a speed change mechanism executing modification of rotation speed and transmission of rotation among the main shaft, the reverse idle shaft, and the input shaft;

final gear trains executing power transmission among the input shaft, the intermediate shaft and the output shaft, wherein a communicating port extends between the crankcase and the gear chamber, the communicating port being formed in one side face of the crankcase and allowing the gear chamber to communicate with a crank chamber, the lubricating oil fed to the gear chamber is discharged through the communicating port to the inside of the crankcase and returned to the oil storage portion, the input shaft and the output shaft are arranged so that a line connecting a shaft center of the input shaft and a shaft center of the output shaft extends substantially horizontally, the intermediate shaft is disposed above and between the input shaft and the output shaft, and the communicating port is disposed below the intermediate shaft.

10. The power unit according to claim 9, wherein the communicating port is formed adjacent to a wall surface extending downward toward the oil storage portion.

11. The power unit according to claim 9, wherein the communicating port is disposed adjacent to a bottom surface of the gear chamber.

12. The power unit according to claim 9, wherein the gear chamber is formed inside a gear case, and the gear case is attached to one side face of the crankcase so as to cover a portion of the one side face of the crankcase, the input shaft receives the rotation of crankshaft after the rotation has been changed in speed, and the output shaft comprises a drive shaft which directly transmits rotation to the wheels, and among gears constituting the final gear trains, at least a drive gear is provided on the input shaft, and an idle gear is provided on the intermediate shaft configured to mesh with the drive gear, wherein the drive gear and the idle gear are housed in the gear chamber.

* * * * *